United States Patent
Katsuragi et al.

(10) Patent No.: US 10,025,074 B2
(45) Date of Patent: Jul. 17, 2018

(54) IMAGING LENS AND IMAGING UNIT

(71) Applicant: SONY CORPORATION, Tokyo (JP)

(72) Inventors: Daigo Katsuragi, Kanagawa (JP);
Shinya Kunimatsu, Kanagawa (JP);
Yasuhide Nihei, Kanagawa (JP);
Masaki Tamura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/531,134

(22) PCT Filed: Oct. 5, 2015

(86) PCT No.: PCT/JP2015/078172
§ 371 (c)(1),
(2) Date: May 26, 2017

(87) PCT Pub. No.: WO2016/092944
PCT Pub. Date: Jun. 16, 2016

(65) Prior Publication Data
US 2017/0322392 A1 Nov. 9, 2017

(30) Foreign Application Priority Data

Dec. 11, 2014 (JP) .................................. 2014-250619

(51) Int. Cl.
*G02B 3/02* (2006.01)
*G02B 13/18* (2006.01)
(Continued)

(52) U.S. Cl.
CPC ........... *G02B 13/0045* (2013.01); *G02B 9/62* (2013.01)

(58) Field of Classification Search
CPC .............................. G02B 13/0045; G02B 9/62
(Continued)

(56) References Cited

U.S. PATENT DOCUMENTS

2014/0153117 A1* 6/2014 Hagiwara .......... G02B 13/0045
359/757

2014/0327808 A1 11/2014 Chen et al.
2015/0042862 A1* 2/2015 Huang ................ H04N 5/2254
348/335

FOREIGN PATENT DOCUMENTS

| CN | 103543520 A | 1/2014 |
| JP | 2013-242449 A | 12/2013 |

(Continued)

OTHER PUBLICATIONS

International Search Report and Written Opinion of PCT Application No. PCT/JP2015/078172, dated Dec. 8, 2015, 02 pages of English Translation and 06 pages of ISRWO.

*Primary Examiner* — James Greece
(74) *Attorney, Agent, or Firm* — Chip Law Group

(57) ABSTRACT

An imaging lens according to the disclosure includes a first lens, a second lens, a third lens, a fourth lens, a fifth lens, and a sixth lens. The first lens includes a meniscus lens that has a convex surface facing object side and has positive refractive power near an optical axis. The second lens has a convex surface facing the object side and has negative refractive power near the optical axis. The third lens has positive refractive power near the optical axis. The fifth lens has positive refractive power near the optical axis. The sixth lens has negative refractive power near the optical axis and has an aspheric surface on the image plane side. The aspheric surface has an inflection point. The first lens, the second lens, the third lens, the fourth lens, the fifth lens, and the sixth lens are disposed in order from the object side toward the image plane side. The imaging lens satisfies the following conditional expressions.

$$f/f5 < 1 \quad (1)$$

$$-0.9 < (L5R1 + L5R2)/(L5R1 - L5R2) < 4 \quad (2)$$

$$f2/f6 > 1 \quad (3)$$

9 Claims, 11 Drawing Sheets

(51) Int. Cl.
*G02B 13/00* (2006.01)
*G02B 9/62* (2006.01)

(58) Field of Classification Search
USPC .................................................. 359/708, 716
See application file for complete search history.

(56) References Cited

FOREIGN PATENT DOCUMENTS

| | | |
|---|---|---|
| JP | 2014-026254 A | 2/2014 |
| JP | 2014-109764 A | 6/2014 |
| KR | 10-2014-0071869 A | 6/2014 |
| TW | 201348789 A | 12/2013 |
| TW | 201435383 A | 9/2014 |
| WO | 2014/155468 A1 | 10/2014 |

* cited by examiner

[FIG. 1]
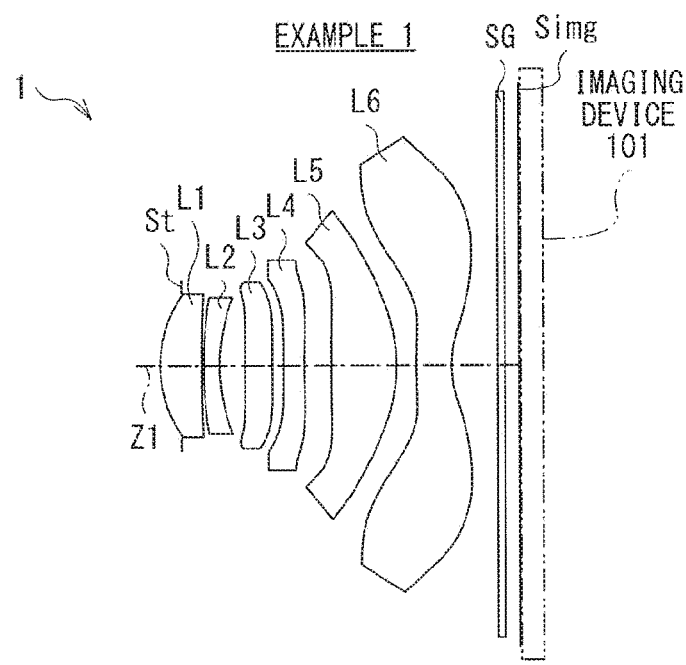
[FIG. 2]
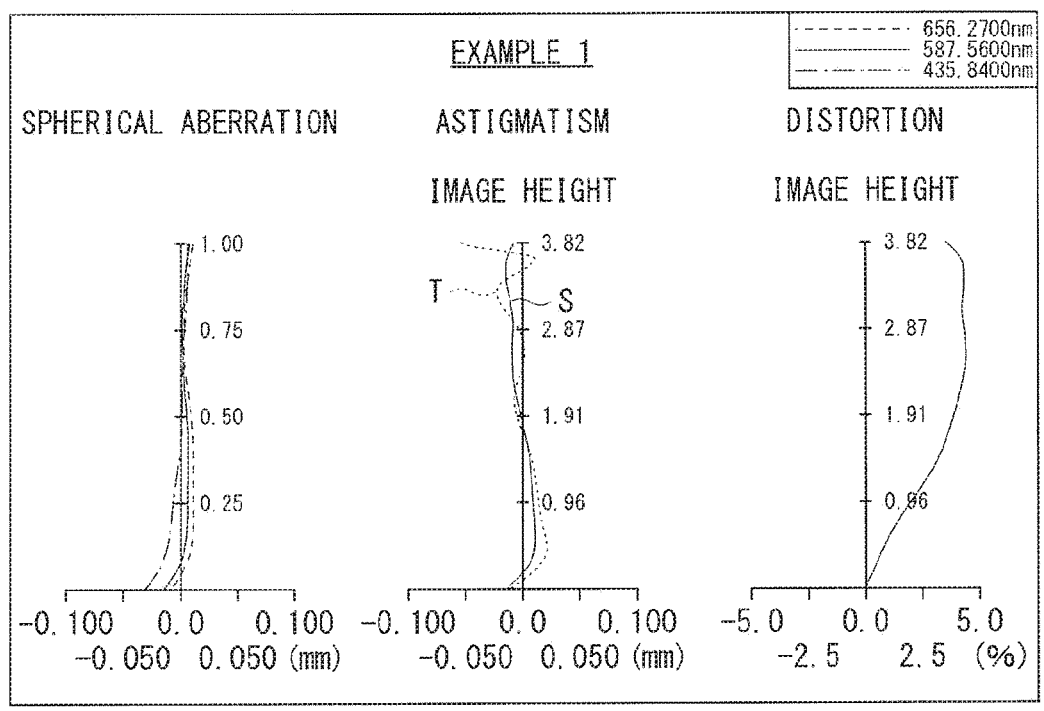

[ FIG. 3 ]
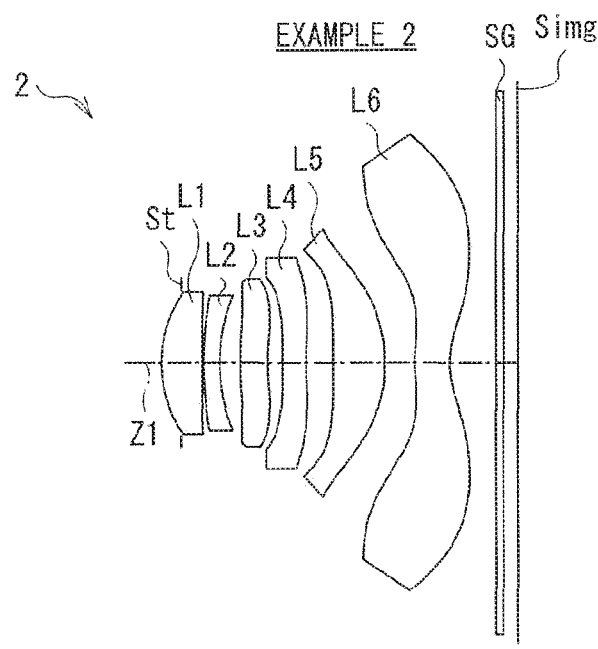
[ FIG. 4 ]
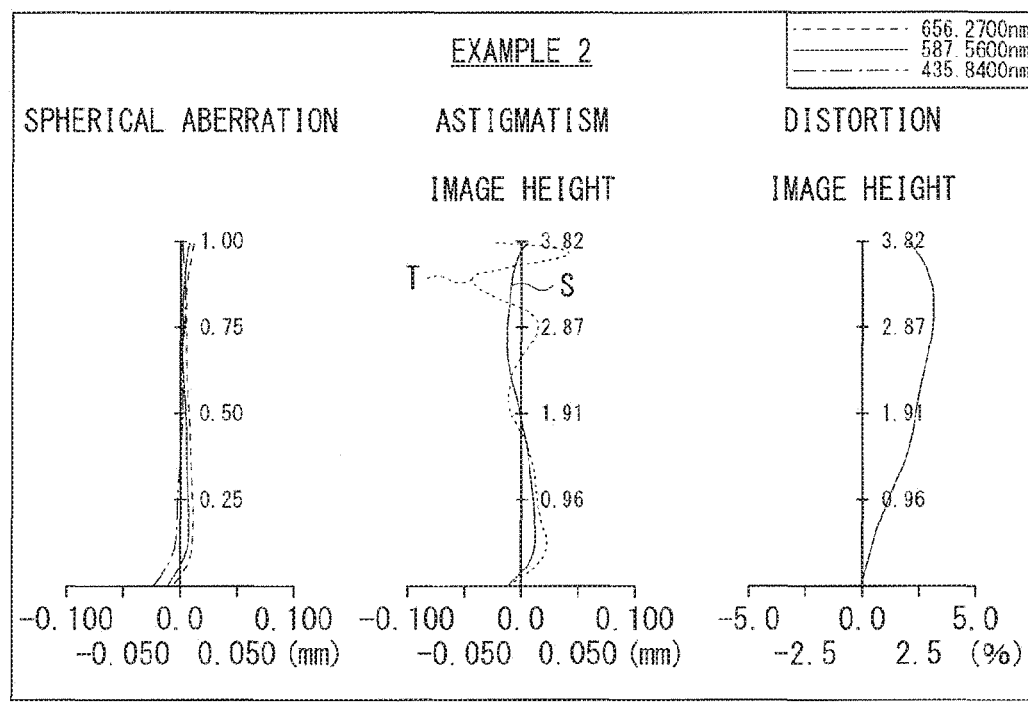

[ FIG. 5 ]
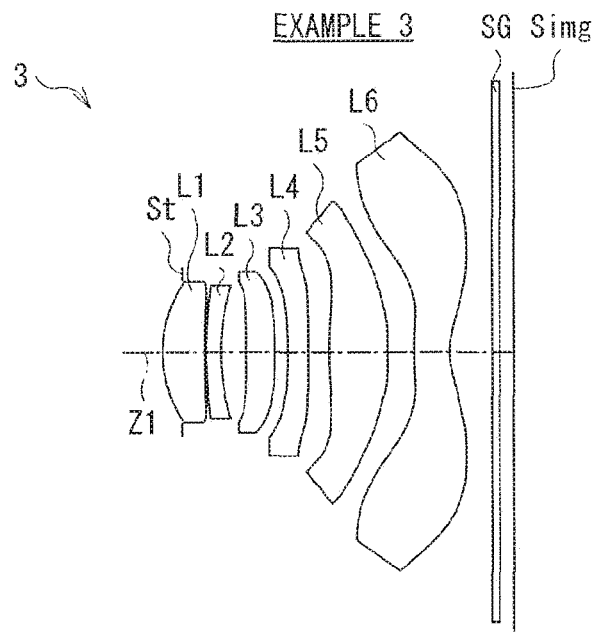
[ FIG. 6 ]
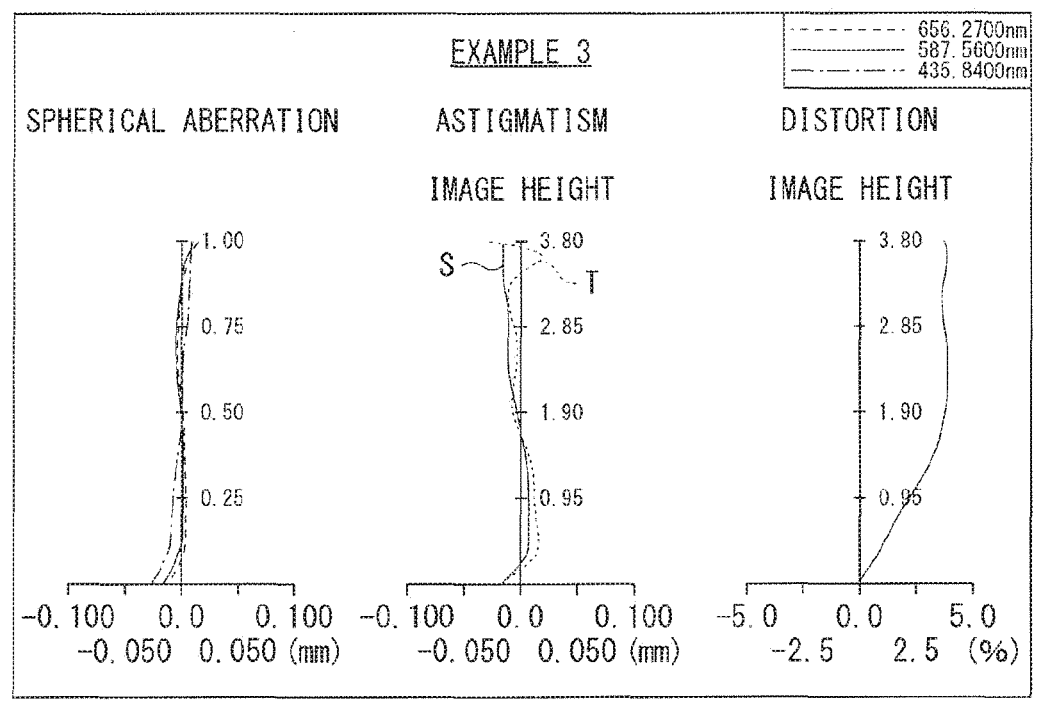

[ FIG. 7 ]
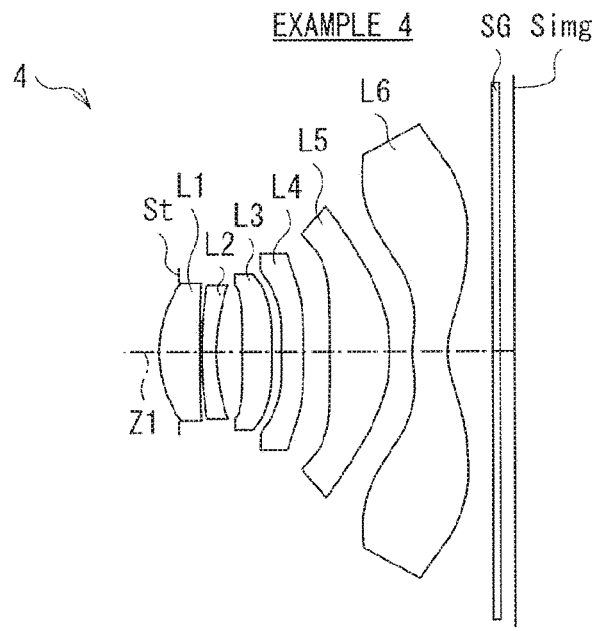
[ FIG. 8 ]
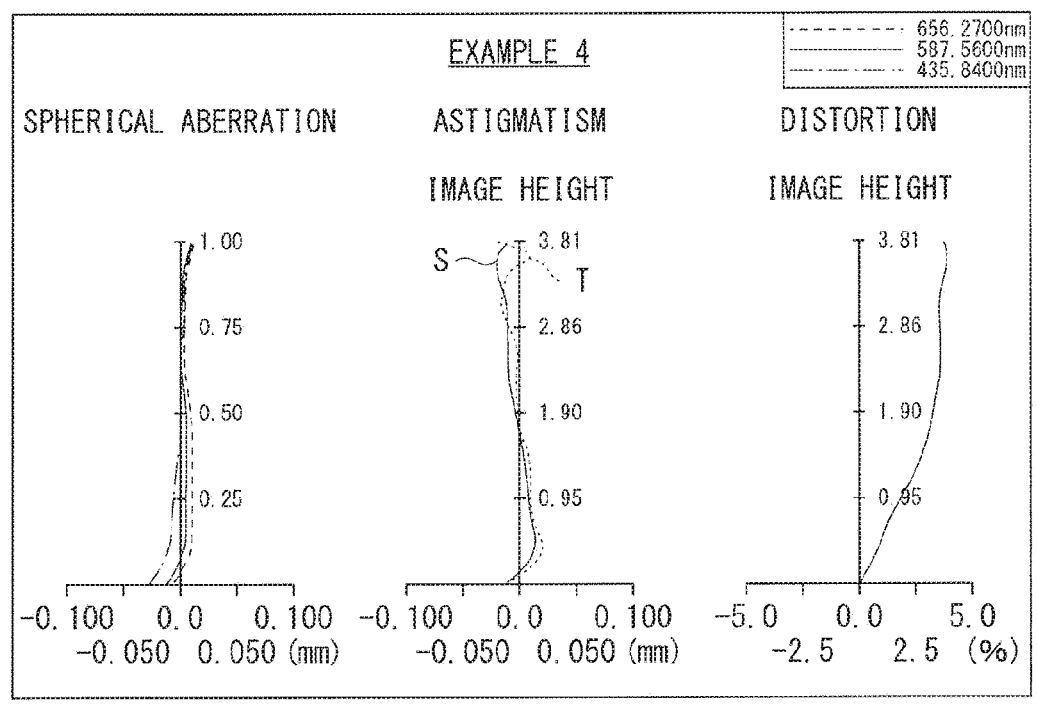

[FIG. 9]
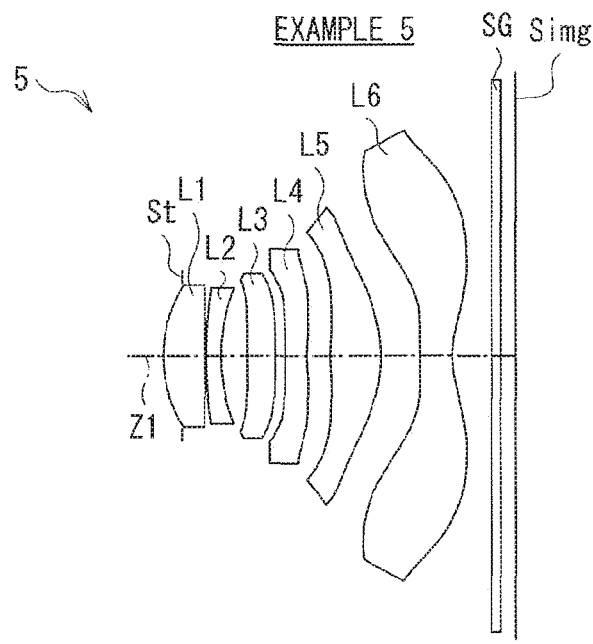
[FIG. 10]
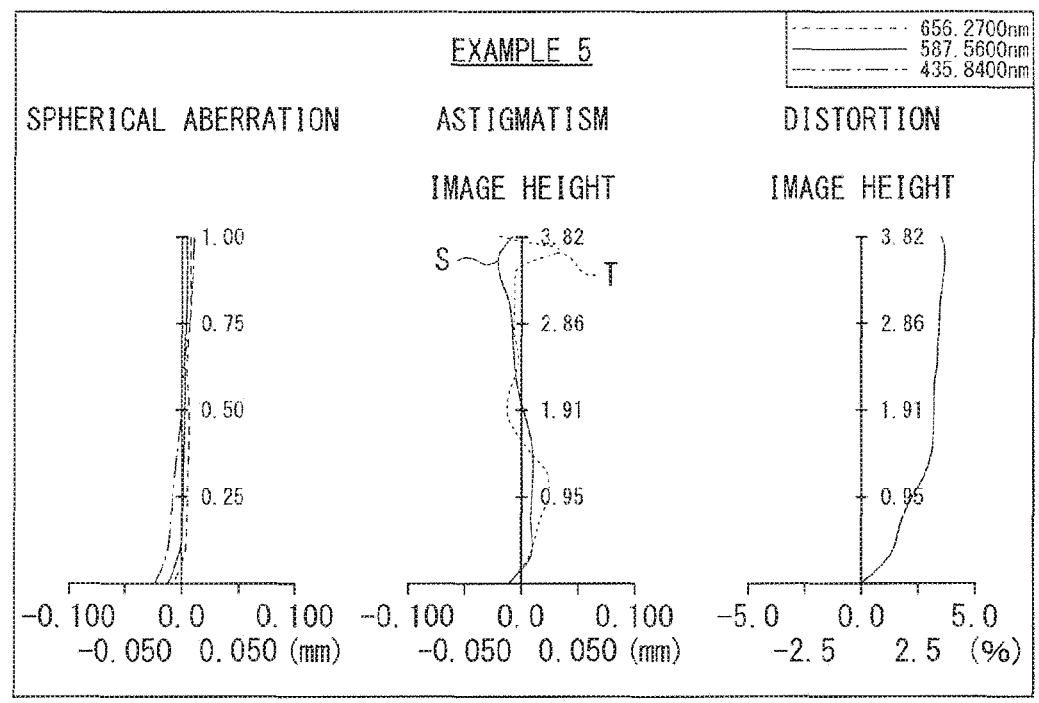

[ FIG. 11 ]
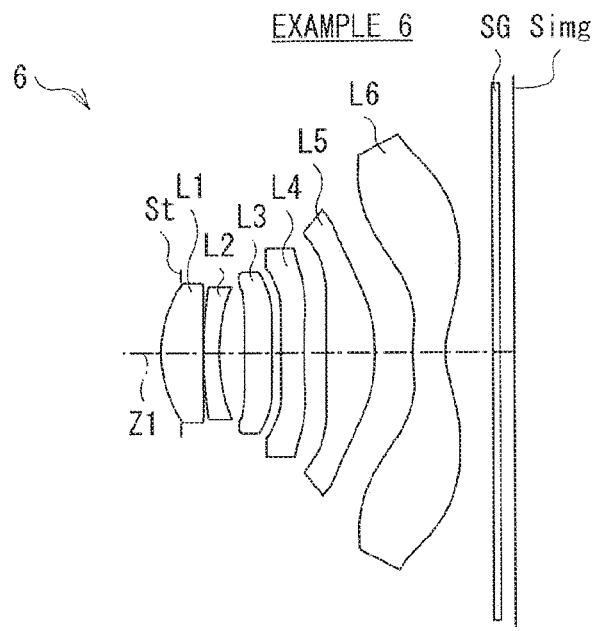
[ FIG. 12 ]
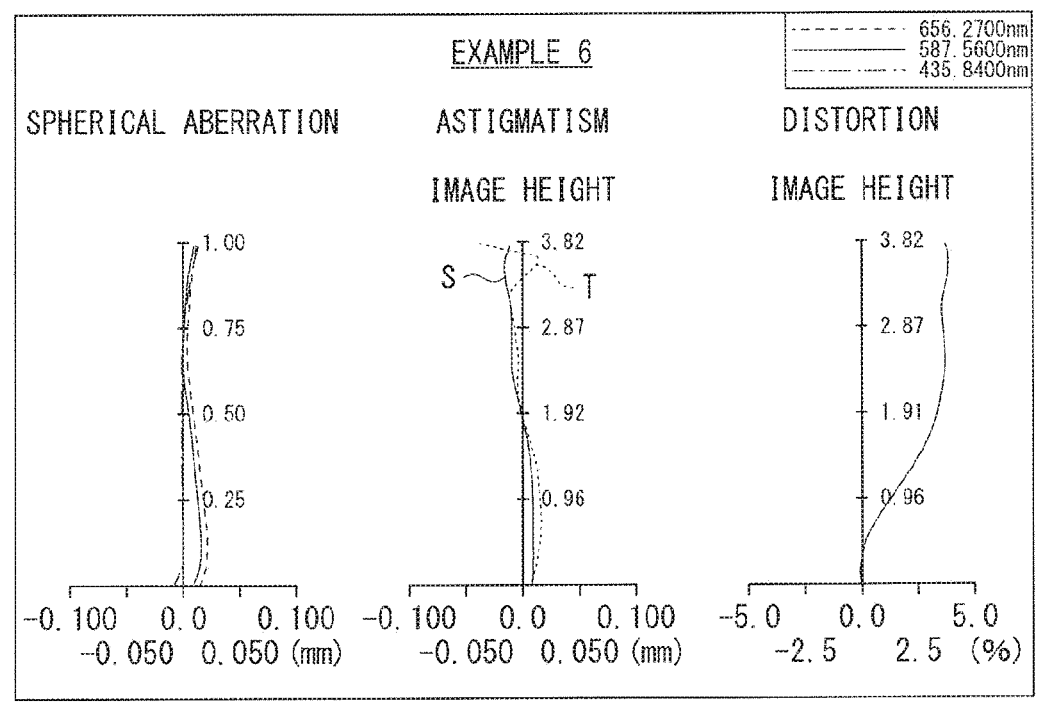

[ FIG. 13 ]
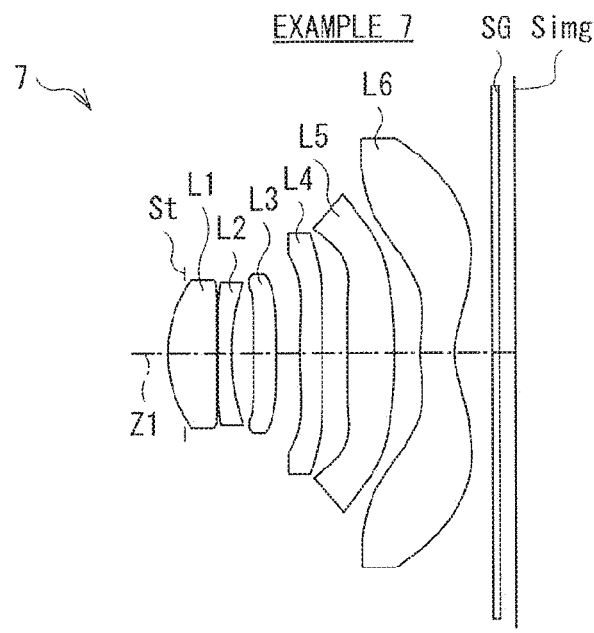
[ FIG. 14 ]
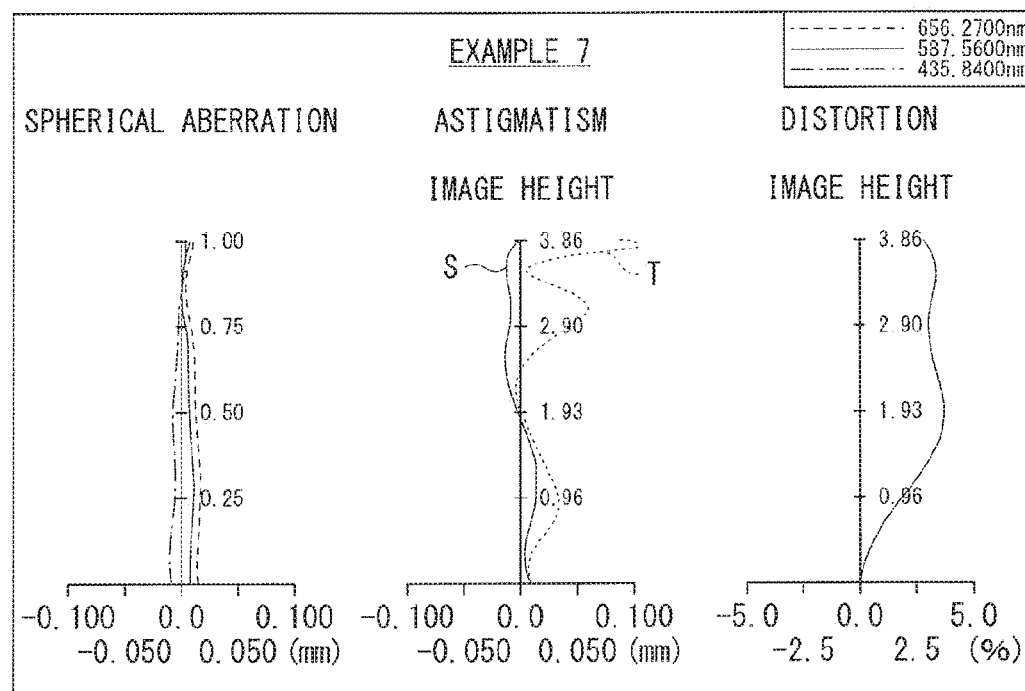

[ FIG. 15 ]
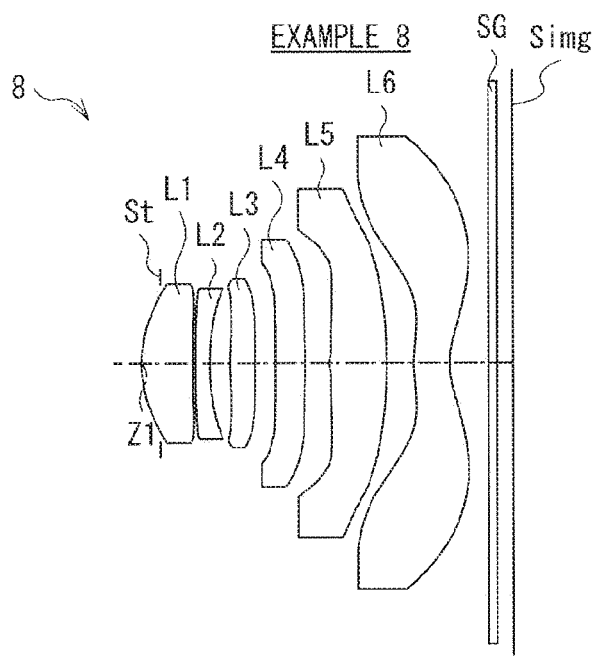
[ FIG. 16 ]
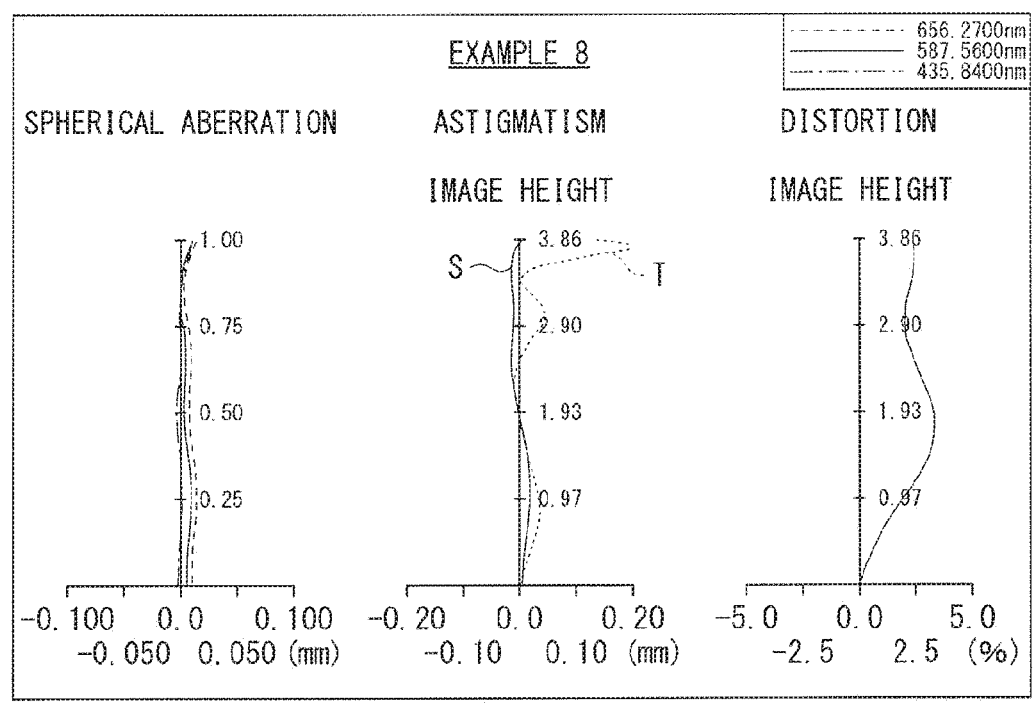

[ FIG. 17 ]
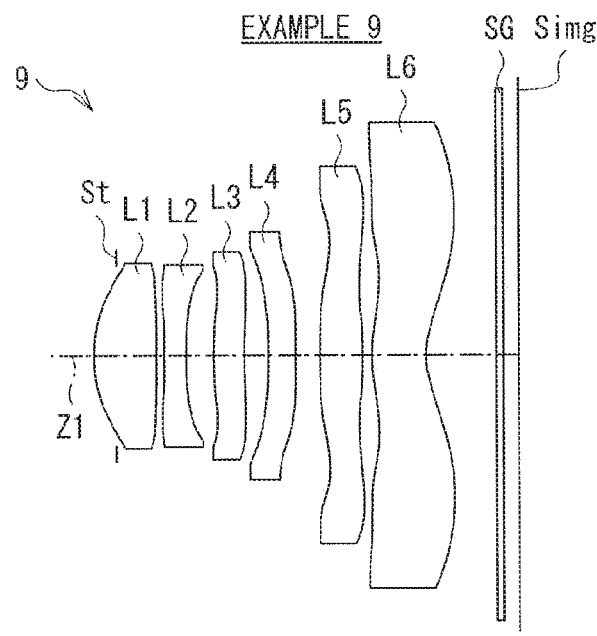
[ FIG. 18 ]
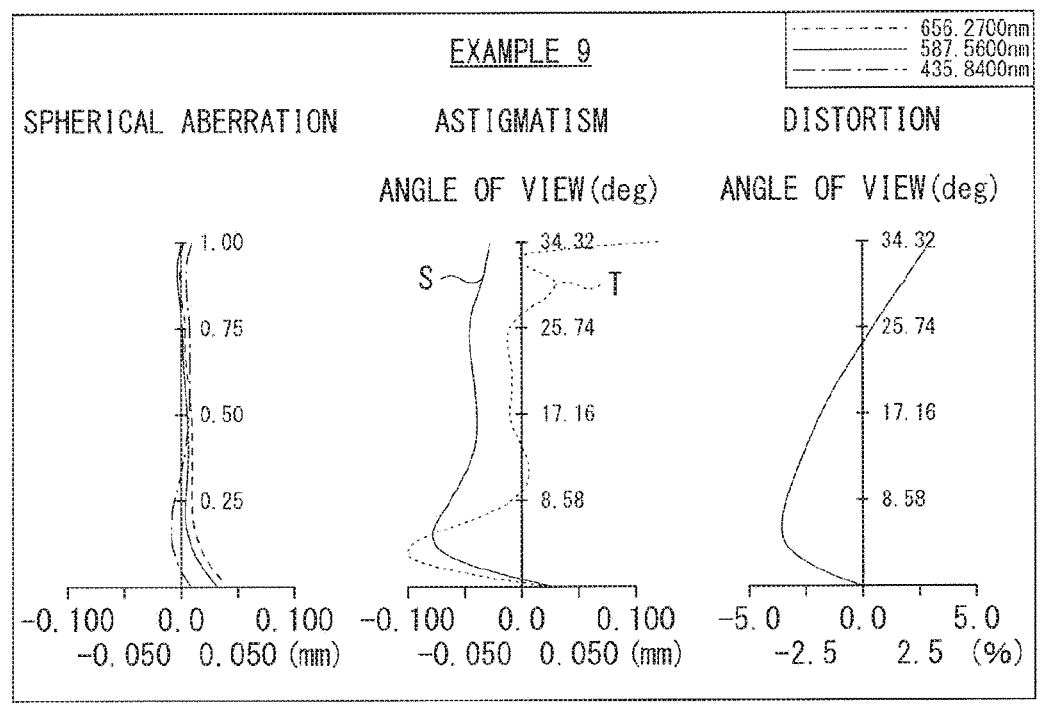

[ FIG. 19 ]
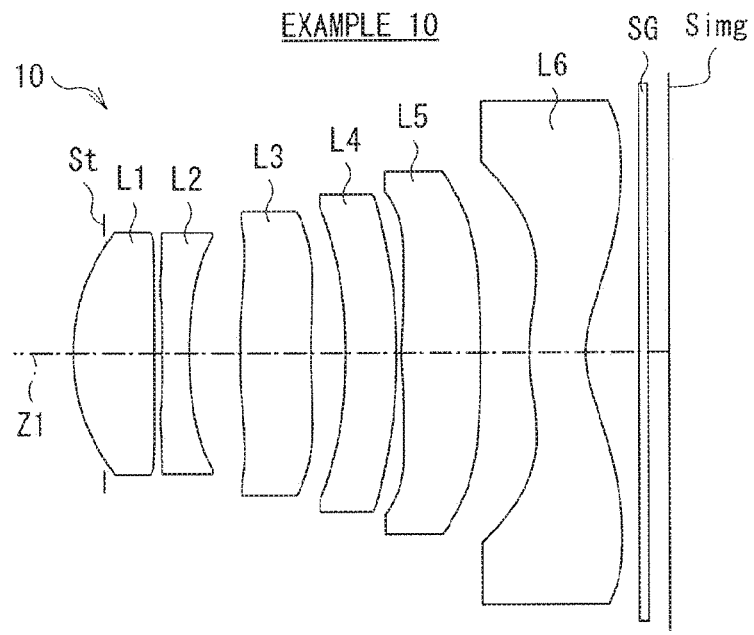
[ FIG. 20 ]
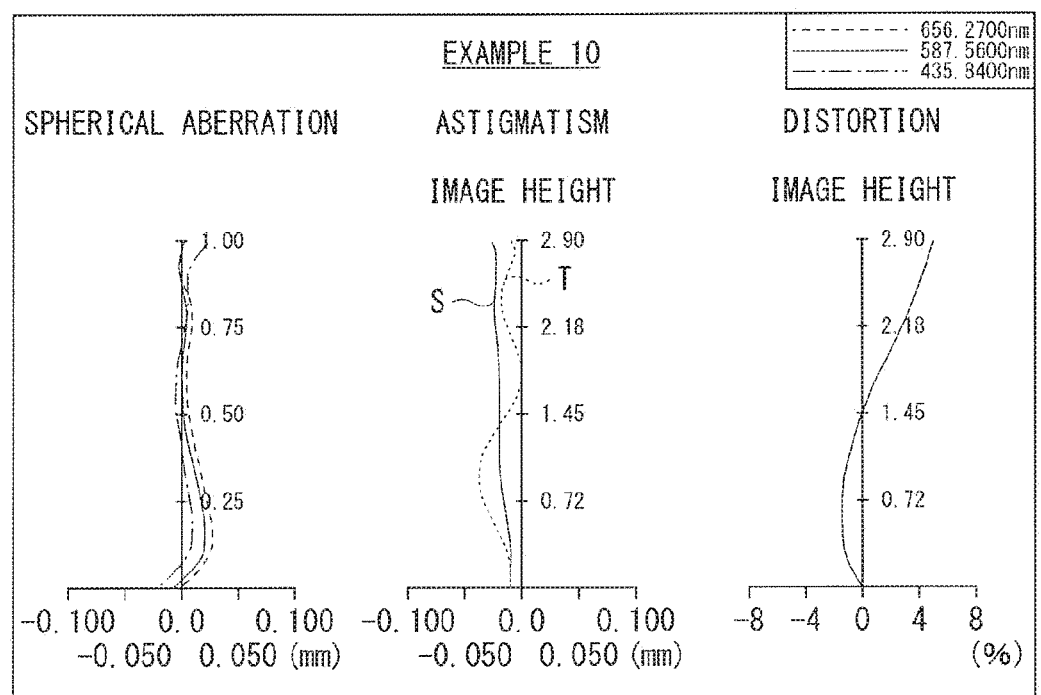

[ FIG. 21 ]
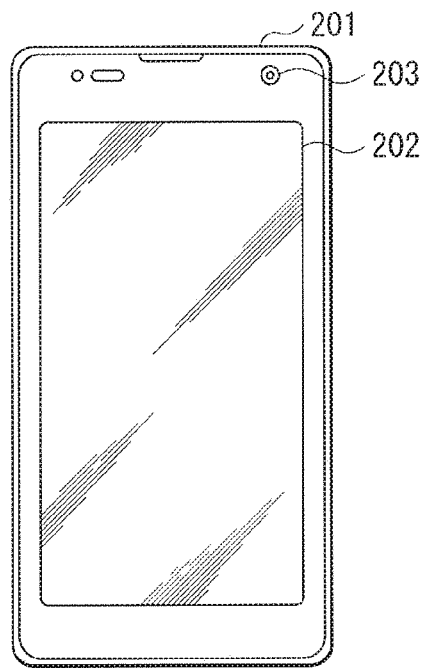
[ FIG. 22 ]
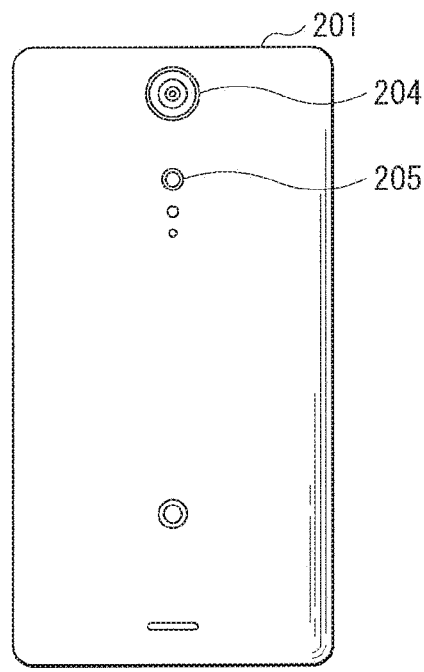

IMAGING LENS AND IMAGING UNIT

CROSS REFERENCE TO RELATED APPLICATIONS

This application is a U.S. National Phase of International Patent Application No. PCT/JP2015/078172 filed on Oct. 5, 2015, which claims priority benefit of Japanese Patent Application No. JP 2014-250619 filed in the Japan Patent Office on Dec. 11, 2014. Each of the above-referenced applications is hereby incorporated herein by reference in its entirety.

TECHNICAL FIELD

The disclosure relates to an imaging lens that forms an optical image of an object on an imaging device such as a charge coupled device (CCD) and a complementary metal oxide semiconductor (CMOS), and to an imaging unit that is mounted with the imaging lens to capture an image, such as a digital still camera, a mobile phone with a camera, and an information mobile terminal with a camera.

BACKGROUND ART

A thin digital still camera such as a card type camera is fabricated year after year, and reduction in size of an imaging unit is demanded. In addition, reduction in size of the imaging unit is also demanded in a mobile phone in order to reduce the thickness of the terminal itself and to secure a space for a lot of functions to be mounted. Therefore, demand for further reduction of the size of the imaging lens mounted on the imaging unit is increasing.

In addition, together with the size reduction of the imaging device such as a CCD and a CMOS, the number of pixels is increased by microfabrication of the pixel pitch of the imaging device. In accordance therewith, high performance is demanded for the imaging lens used in the imaging unit.

High resolution is demanded for the imaging lens used in such an imaging device with high definition; however, the resolution is limited by an F value. Sufficient performance is not obtainable by the F value of about 2.8 because a bright lens with a small F value provides high resolution. Accordingly, an imaging lens with the F value of about 2 that is suitable to the small imaging device with a large number of pixels and high definition is demanded. As the imaging lens for such a purpose, an imaging lens configured of six lenses that allows for increase in aperture ratio and improvement in performance as compared with an imaging lens configured of four or five lenses has been proposed (refer to PTLs 1 and 2).

For example, the imaging lens configured of six lenses described in PTL 1 includes, in order from object side toward image plane side, a first lens having positive refractive power, a second lens having negative refractive power, a third lens, a fourth lens having negative refractive power, a fifth lens having positive refractive power, and a sixth lens. The first lens has a surface with a positive radius of curvature on the object side, the second lens has a surface with a positive radius of curvature on the image plane side, and the fifth lens has a surface with a negative radius of curvature on each of the object side and the image plane side. Each of the third lens to the sixth lens has refractive power lower than the refractive power of each of the first lens and the second lens.

CITATION LIST

Patent Literature

PTL 1: Japanese Unexamined Patent Application Publication No. 2013-242449
PTL 2: Japanese Unexamined Patent Application Publication No. 2014-26254

SUMMARY OF INVENTION

In recent years, to address the imaging device with the increased number of pixels, development of a lens system that has high imaging performance in the range from a center angle of view to a peripheral angle of view while realizing reduction of the total length has been demanded as the imaging lens. The imaging lens configured of six lenses described in the above-described PTLs 1 and 2 is not sufficient in performance in terms of reduction of the optical length and correction of color aberration and field curvature, and has room for improvement.

Therefore, it is desirable to provide an imaging lens and an imaging unit that make it possible to favorably correct various aberrations while the size is small.

An imaging lens according to an embodiment of the disclosure includes a first lens, a second lens, a third lens, a fourth lens, a fifth lens, and a sixth lens. The first lens includes a meniscus lens that has a convex surface facing object side and has positive refractive power near an optical axis. The second lens has a convex surface facing the object side and has negative refractive power near the optical axis. The third lens has positive refractive power near the optical axis. The fifth lens has positive refractive power near the optical axis. The sixth lens has negative refractive power near the optical axis and has an aspheric surface on the image plane side. The aspheric surface has an inflection point. The first lens, the second lens, the third lens, the fourth lens, the fifth lens, and the sixth lens are disposed in order from the object side toward the image plane side. The imaging lens satisfies the following conditional expressions, $$f1/f5 < 1 \quad (1)$$

$$-0.9 < (L5R1 + L5R2)/(L5R1 - L5R2) < 4 \quad (2)$$

$$f2/f6 > 1 \quad (3)$$

where f1 is a focal length of the first lens, f5 is a focal length of the fifth lens, L5R1 is a paraxial radius of curvature of a surface, on the object side, of the fifth lens, L5R2 is a paraxial radius of curvature of a surface, on the image plane side, of the fifth lens, f2 is a focal length of the second lens, and f6 is a focal length of the sixth lens.

An imaging unit according to an embodiment of the disclosure includes: an imaging lens; and an imaging device that outputs an imaging signal based on an optical image formed by the imaging lens, in which the imaging lens is configured of the imaging lens according to the above-described embodiment of the disclosure.

In the imaging lens or the imaging unit according to the embodiment of the disclosure, the configurations of the respective lenses are optimized in the entire configuration configured of six lenses.

In the imaging lens or the imaging unit according to the embodiment of the disclosure, the configurations of the respective lenses are optimized in the entire configuration configured of six lenses, which makes it possible to favorably correct various aberrations while the size is small.

Note that effects described here are non-limiting. One or more of effects described in the disclosure may be provided.

BRIEF DESCRIPTION OF DRAWINGS

FIG. 1 is a lens cross-sectional diagram illustrating a first configuration example of an imaging lens according to an embodiment of the disclosure.

FIG. 2 is an aberration diagram illustrating various aberrations in Numerical example 1 in which specific numerical values are applied to the imaging lens illustrated in FIG. 1.

FIG. 3 is a lens cross-sectional diagram illustrating a second configuration example of the imaging lens.

FIG. 4 is an aberration diagram illustrating various aberrations in Numerical example 2 in which specific numerical values are applied to the imaging lens illustrated in FIG. 3.

FIG. 5 is a lens cross-sectional diagram illustrating a third configuration example of the imaging lens.

FIG. 6 is an aberration diagram illustrating various aberrations in Numerical example 3 in which specific numerical values are applied to the imaging lens illustrated in FIG. 5.

FIG. 7 is a lens cross-sectional diagram illustrating a fourth configuration example of the imaging lens.

FIG. 8 is an aberration diagram illustrating various aberrations in Numerical example 4 in which specific numerical values are applied to the imaging lens illustrated in FIG. 7.

FIG. 9 is a lens cross-sectional diagram illustrating a fifth configuration example of the imaging lens.

FIG. 10 is an aberration diagram illustrating various aberrations in Numerical example 5 in which specific numerical values are applied to the imaging lens illustrated in FIG. 9.

FIG. 11 is a lens cross-sectional diagram illustrating a sixth configuration example of the imaging lens.

FIG. 12 is an aberration diagram illustrating various aberrations in Numerical example 6 in which specific numerical values are applied to the imaging lens illustrated in FIG. 11.

FIG. 13 is a lens cross-sectional diagram illustrating a seventh configuration example of the imaging lens.

FIG. 14 is an aberration diagram illustrating various aberrations in Numerical example 7 in which specific numerical values are applied to the imaging lens illustrated in FIG. 13.

FIG. 15 is a lens cross-sectional diagram illustrating an eighth configuration example of the imaging lens.

FIG. 16 is an aberration diagram illustrating various aberrations in Numerical example 8 in which specific numerical values are applied to the imaging lens illustrated in FIG. 15.

FIG. 17 is a lens cross-sectional diagram illustrating a ninth configuration example of the imaging lens.

FIG. 18 is an aberration diagram illustrating various aberrations in Numerical example 9 in which specific numerical values are applied to the imaging lens illustrated in FIG. 17.

FIG. 19 is a lens cross-sectional diagram illustrating a tenth configuration example of the imaging lens.

FIG. 20 is an aberration diagram illustrating various aberrations in Numerical example 10 in which specific numerical values are applied to the imaging lens illustrated in FIG. 19.

FIG. 21 is a front view of a configuration example of an imaging unit.

FIG. 22 is a back view of the configuration example of the imaging unit.

DESCRIPTION OF EMBODIMENTS

Some embodiments of the disclosure are described in detail below with reference to drawings. Note that the description is given in the following order.
1. Basic configuration of lens
2. Action and effects
3. Application example to imaging unit
4. Numerical examples of lens
5. Other embodiments 1. Basic Configuration of Lens FIG. 1 illustrates a first configuration example of an imaging lens according to an embodiment of the disclosure. FIG. 3 illustrates a second configuration example of the imaging lens. FIG. 5 illustrates a third configuration example of the imaging lens. FIG. 7 illustrates a fourth configuration example of the imaging lens. FIG. 9 illustrates a fifth configuration example of the imaging lens. FIG. 11 illustrates a sixth configuration example of the imaging lens. FIG. 13 illustrates a seventh configuration example of the imaging lens. FIG. 15 illustrates an eighth configuration example of the imaging lens. FIG. 17 illustrates a ninth configuration example of the imaging lens. FIG. 19 illustrates a tenth configuration example of the imaging lens. Numerical examples in which specific numerical values are applied to the configuration examples are described later. In FIG. 1 and other drawings, a reference sign IMG refers to an image plane, and a reference sign Z1 refers to an optical axis. A seal glass SG for protection of an imaging device and optical members such as various kinds of optical filters may be provided between the imaging lens and the image plane IMG.

In the following, the configuration of the imaging lens according to the present embodiment is described in appropriate association with the configuration examples illustrated in FIG. 1 and other drawings; however, the technology of the disclosure is not limited to the illustrated configuration examples.

The imaging lens according to the present embodiment is substantially configured of six lenses, that are, a first lens L1, a second lens L2, a third lens L3, a fourth lens L4, a fifth lens L5, and a sixth lens L6 that are disposed along the optical axis Z1 in order from object side.

The first lens L1 is a meniscus lens that has a convex surface facing the object side and has positive refractive power near the optical axis.

The second lens L2 has a convex surface facing the object side and has negative refractive power near the optical axis.

The third lens L3 has positive refractive power near the optical axis.

The fourth lens L4 has positive or negative refractive power near the optical axis.

The fifth lens L5 has positive refractive power near the optical axis.

The sixth lens L6 has negative refractive power near the optical axis. In the sixth lens L6, a surface on image plane side may preferably be formed in an aspheric shape that has an inflection point and is changed in concave-convex shape in the middle from a center part to a peripheral part. The sixth lens L6 may preferably have one or more inflection points other than an intersection with the optical axis Z1. More specifically, the surface, on the image side, of the sixth lens L6 may preferably have an aspheric shape in which a part near the optical axis has a concave shape and a peripheral part has a convex shape.

Note that all of the first lens L1 to the sixth lens L6 may preferably be plastic lenses.

The imaging lens according to the present embodiment satisfies the following conditional expression that relates to the first lens L1 and the fifth lens L5, $$f1/f5<1 \qquad (1)$$

where f1 is a focal length of the first lens L1, and f5 is a focal length of the fifth lens L5.

The imaging lens according to the present embodiment also satisfies the following conditional expression that relates to a paraxial radius of curvature L5R1 of a surface, on the object side, of the fifth lens L5 and a paraxial radius of curvature L5R2 of a surface, on the image plane side, of the fifth lens L5, $$-0.9<(L5R1+L5R2)/(L5R1-L5R2)<4 \qquad (2)$$

where L5R1 is the paraxial radius of curvature of the surface, on the object side, of the fifth lens L5, and L5R2 is the paraxial radius of curvature of the surface, on the image plane side, of the fifth lens L5.

The imaging lens according to the present embodiment further satisfies the following conditional expression that relates to the second lens L2 and the sixth lens L6, $$f2/f6>1 \qquad (3)$$

where f2 is a focal length of the second lens L2, and f6 is a focal length of the sixth lens L6.

Moreover, the imaging lens according to the present embodiment may preferably further satisfy predetermined conditional expressions and other expressions described later.

2. Action and Effects

Next, action and effects of the imaging lens according to the present embodiment are described. A preferable configuration of the imaging lens according to the present embodiment is described together.

Note that the effects described in the present specification are illustrative and non-limiting. Effects other than those described in the present specification may be provided.

In the imaging lens according to the present embodiment, the lenses are disposed with respective appropriate refractive power and the shapes of the respective lenses are optimized with efficient use of an aspheric surface, in the entire configuration configured of six lenses. Further, the imaging lens according to the present embodiment satisfies the above-described conditional expressions (1) to (3) to appropriately configure each of the lenses, which makes it possible to favorably correct various aberrations while the imaging lens is small-sized.

The above-described conditional expression (1) specifies a ratio between the focal length of the first lens L1 and the focal length of the fifth lens L5. The imaging lens satisfies the conditional expression (1), thereby securing favorable performance. If the ratio exceeds an upper limit of the conditional expression (1), the refractive power of the fifth lens L5 becomes excessively high, which increases eccentric error sensitivity. As a result, for example, on-axis comatic aberration and asymmetric blurring in a screen occur, which may cause deterioration of image quality.

Note that the numerical range of the conditional expression (1) may be more preferably set as the following conditional expression (1)'.

$$0.20<f1/f5<0.94 \qquad (1)'$$

The above-described conditional expression (2) specifies relationship between the paraxial radius of curvature of the surface, on the object side, of the fifth lens L5 and the paraxial radius of curvature of the surface, on the image plane side, of the fifth lens L5. The imaging lens according to the present embodiment satisfies the conditional expression (2), thereby favorably correcting various aberrations. Exceeding of the lower limit of the conditional expression (2) is unfavorable because high-order aberration occurs on an off-axis light beam and the optical performance is accordingly deteriorated. Exceeding of the upper limit of the conditional expression (2) is unfavorable because correction of, for example, comatic aberration and field curvature becomes difficult and astigmatic difference is increased.

Note that the numerical range of the conditional expression (2) may be more preferably set as the following conditional expression (2)'.

$$-0.81<(L5R1+L5R2)/(L5R1-L5R2)<3.8 \qquad (2)'$$

The above-described conditional expression (3) specifies a ratio between the focal length of the second lens L2 and the focal length of the sixth lens L6. The imaging lens according to the present embodiment satisfies the conditional expression (3), thereby securing favorable performance. When the ratio exceeds a lower limit of the conditional expression (3), the refractive power of the sixth lens L6 becomes excessively high, which deteriorates eccentric error sensitivity. As a result, for example, on-axis comatic aberration and asymmetric blurring in a screen occur, which may cause deterioration of image quality.

Note that the numerical range of the conditional expression (3) may be more preferably set as the following conditional expression (3)'.

$$1<f2/f6<3.4 \qquad (3)'$$

Further, the imaging lens according to the present embodiment may preferably satisfy one or more of the following conditional expressions (4) to (8), $$f2/f<-1 \qquad (4)$$

where f is a focal length of the entire system.

The above-described conditional expression (4) specifies a ratio between the focal length of the second lens L2 and the focal length of the entire system. By satisfying the conditional expression (4), favorable performance is secured. When the ratio exceeds an upper limit of the conditional expression (4), the negative refractive power of the second lens L2 becomes higher than necessary, which makes it difficult to correct, for example, comatic aberration and distortion aberration on the peripheral part.

Note that the numerical range of the conditional expression (4) may be more preferably set as the following conditional expression (4)'.

$$-3<f2/f<-1.1 \qquad (4)'$$

$$\Sigma D/f>1 \qquad (5)$$

where ΣD is a distance on the optical axis from an apex of the surface, on the object side, of the first lens L1 to the image plane.

The above-described conditional expression (5) specifies a ratio between a length from the surface closest to the object to the image plane and the focal length of the entire system. By satisfying the conditional expression (5), favorable performance is secured. If the ratio exceeds a lower limit of the conditional expression (5), the refractive power of the entire system is weakened, and necessary and sufficient angle of view is not obtainable. Further, for example, maintaining of the performance and manufacturing of the imaging lens become difficult, and it is not possible to secure a sufficient thickness or a sufficient edge thickness of each lens.

Note that the numerical range of the conditional expression (5) may be more preferably set as the following conditional expression (5)'.

$$1.1 < \Sigma D/f < 1.4 \qquad (5)'$$

$$f5/f > 0.85 \qquad (6)$$

The above-described conditional expression (6) specifies a ratio between the focal length of the fifth lens L5 and the focal length of the entire system. By satisfying the conditional expression (6), favorable performance is secured. If the ratio exceeds a lower limit of the conditional expression (6), the refractive power of the fifth lens L5 becomes high, which makes it difficult to correct astigmatism, and other aberrations.

Note that the numerical range of the conditional expression (6) may be more preferably set as the following conditional expression (6)'.

$$0.9 < f5/f < 4.0 \qquad (6)'$$

$$\Sigma D/L2d > 18 \qquad (7)$$

where L2$d$ is a center thickness of the second lens L2.

The above-described conditional expression (7) specifies a ratio between the length from the surface closest to the object to the image plane and the center thickness of the second lens L2. By satisfying the conditional expression (7), favorable performance is secured with a low profile. If the ratio exceeds a lower limit of the conditional expression (7), it is not possible to appropriately maintain the refractive power of each of lenses, which makes it difficult to correct, for example, astigmatism and field curvature.

Note that the numerical range of the conditional expression (7) may be more preferably set as the following conditional expression (7)'.

$$18.5 < \Sigma D/L2d < 26 \qquad (7)'$$

$$v4 - v2 < 37 \qquad (8)$$

where v2 is Abbe number of the second lens L2, and v4 is Abbe number of the fourth lens L4.

The above-described conditional expression (8) specifies a difference between the Abbe number of the fourth lens L4 and the Abbe number of the second lens L2. By satisfying the conditional expression (8), favorable performance is secured with a low profile. If the difference exceeds an upper limit of the conditional expression (8), the refractive power of, for example, an f line and a g line are not sufficiently obtainable, which makes it difficult to correct on-axis color aberration.

Note that the numerical range of the conditional expression (8) may be preferably set as the following conditional expression (8)'.

$$-4 < v4 - v2 < 37 \qquad (8)'$$

More preferably, the following conditional expression (8)" may be satisfied.

$$0 \le v4 - v2 < 36 \qquad (8)''$$

In addition, in the imaging lens according to the present embodiment, forming the lens surface closest to the image plane (the surface, on the image plane side, of the sixth lens L6) in an aspheric shape in which a part near the optical axis has a concave shape and a peripheral part has a convex shape suppresses an incident angle of the light that has been outputted from the sixth lens L6, to the image plane IMG.

3. Application Example to Imaging Unit

FIG. 21 and FIG. 22 each illustrate a configuration example of an imaging unit to which the imaging lens according to the present embodiment is applied. The configuration example is an example of a mobile terminal apparatus (such as a mobile information terminal and a mobile phone terminal) including the imaging unit. The mobile terminal apparatus includes a substantially rectangular housing 201. For example, a display section 202 and a front camera section 203 are provided on a front surface of the housing 201 (FIG. 21). For example, a main camera section 204 and a camera flash 205 are provided on a rear surface of the housing 201 (FIG. 22).

For example, the display section 202 may be a touch panel that detects contact to a surface to allow for various kinds of operation. Therefore, the display section 202 has a display function of displaying various kinds of information and an input function of allowing for various kinds of input operation by a user. The display section 202 displays, for example, an operation state and various kinds of data such as an image captured by the front camera section 203 or the main camera section 204.

For example, the imaging lens according to the present embodiment is applicable as a camera module lens of the imaging unit (the front camera section 203 or the main camera section 204) in the mobile terminal apparatus as illustrated in FIG. 21 and FIG. 22. When the imaging lens according to the present embodiment is used as such a camera module lens, an imaging device 101 such as a charge coupled device (CCD) and a complementary metal oxide semiconductor (CMOS) is disposed near the image plane IMG of the imaging lens as illustrated in FIG. 1. The imaging device 101 outputs an imaging signal (an image signal) based on an optical image formed by the imaging lens. In this case, as illustrated in FIG. 1 and other drawings, the seal glass SG for protection of the imaging device and the optical members such as various kinds of optical filters may be provided between the sixth lens L6 and the image plane IMG.

Note that the imaging lens according to the present embodiment is applicable as an imaging lens of other electronic apparatuses such as a digital still camera and a digital video camera without being limited to the above-described mobile terminal apparatus. In addition, the imaging lens according to the present embodiment is applicable to small imaging units using a solid-state imaging device such as a CCD and a CMOS. The small imaging units may include, for example, an optical sensor, a mobile module camera, and a WEB camera.

EXAMPLES

4. Numerical Examples of Lens

Next, specific Numerical examples of the imaging lens according to the present embodiment are described. Numerical examples in which specific values are applied to the imaging lenses 1, 2, 3, 4, 5, 6, 7, 8, 9, and 10 in the respective configuration examples respectively illustrated in FIG. 1, FIG. 3, FIG. 5, FIG. 7, FIG. 9, FIG. 11, FIG. 13, FIG. 15, FIG. 17, and FIG. 19 are described here.

Note that symbols, etc. in tables and the description below indicate as follows. A symbol "Si" indicates the number of the i-th surface counted from the side closest to the object. A symbol "Ri" indicates a value (mm) of a paraxial radius of curvature of the i-th surface. A symbol "Di" indicates a value (mm) of a spacing on the optical axis between the i-th surface and the (i+1)th surface. A symbol "Ndi" indicates a value of a refractive index of a d line (having a wavelength of 587.6 nm) of a material of an optical element having the i-th surface. A symbol "vdi" indicates a value of Abbe number in the d line of the material of the optical element having the i-th surface. A portion at which a value of "Ri" is "∞" is a flat surface, a virtual surface, or an aperture surface (an aperture stop). A surface with "STO" in "Si" is the aperture stop. A symbol "f" indicates the focal length of the entire lens system, a symbol "Fno" indicates an F number, and a symbol "ω" indicates a half angle of view.

Some lenses used in Numerical examples have an aspheric lens surface. A surface with "ASP" in "Si" is an aspheric surface. The aspheric shape is defined by the following expression. Note that, in the respective tables showing the aspheric surface coefficients described later, "E-i" represents an exponential expression having 10 as a base, i.e., "$10^{-i}$". For example, "0.12345E−05" represents "$0.12345 \times 10^{-5}$".

$$Z = C \cdot h^2 / \{1 + (1 - K \cdot C^2 \cdot h^2)^{1/2}\} + \Sigma An \cdot h^n \quad (A)$$

(n is an integer of three or more)
where Z is a depth of the aspheric surface, C is a paraxial curvature that is equal to 1/R, h is a distance from the optical axis to the lens surface, K is an eccentricity (second-order aspheric surface coefficient), and An is an n-th order aspheric surface coefficient.

[Configuration Common to Numerical Examples]

Each of the imaging lenses 1 to 10 to which respective Numerical examples described below are applied has a configuration that satisfies the above-described basic configuration of the lens. Each of the imaging lenses 1 to 10 is substantially configured of six lenses, that are, the first lens L1, the second lens L2, the third lens L3, the fourth lens L4, the fifth lens L5, and the sixth lens L6 in order from the object side.

The first lens L1 is a meniscus lens that has a convex surface facing the object side and has positive refractive power near the optical axis. The second lens L2 has a convex surface facing the object side and has negative refractive power near the optical axis. The third lens L3 has positive refractive power near the optical axis. The fourth lens L4 has positive or negative refractive power near the optical axis. The fifth lens L5 has positive refractive power near the optical axis. The surface, on the image plane side, of the sixth lens L6 has an aspheric shape in which a part near the optical axis has a concave shape and a peripheral part has a convex shape.

The seal glass SG is provided between the sixth lens L6 and the image plane IMG. An aperture stop St is disposed near the front of the first lens L1.

Numerical Example 1

Table 1 shows lens data of Numerical example 1 in which specific numerical values are applied to the imaging lens 1 illustrated in FIG. 1. In addition, Table 2 shows values of the focal length f of the entire system, the F number Fno, the total length, and the half angle of view ω. Table 2 also shows values of the focal length f1 of the first lens, the focal length f2 of the second lens, the focal length f3 of the third lens, the focal length f4 of the fourth lens, the focal length f5 of the fifth lens, and the focal length f6 of the sixth lens. As illustrated in the numerical data, the fourth lens L4 has negative refractive power near the optical axis, in the imaging lens 1 illustrated in FIG. 1.

In addition, all of the first lens L1 to the sixth lens L6 are plastic lenses.

In the imaging lens 1, both surfaces of each of the first lens L1 to the sixth lens L6 have aspheric shapes. Table 3 shows values of aspheric surface coefficients A3 to A20 in the aspheric surfaces, together with the values of the coefficient K.

TABLE 1

Example 1

| Lens | Si | Ri | Di | Ndi | vdi |
|---|---|---|---|---|---|
| (Virtual Surface) | 1 | ∞ | 0.2900 | | |
| (St) | 2(STO) | ∞ | −0.2900 | | |
| L1 | 3(ASP) | 1.7002 | 0.5985 | 1.543 | 56.00 |
| | 4(ASP) | 10.9362 | 0.0300 | | |
| L2 | 5(ASP) | 6.6683 | 0.2170 | 1.650 | 21.50 |
| | 6(ASP) | 3.1229 | 0.3583 | | |
| L3 | 7(ASP) | 26.8750 | 0.4000 | 1.543 | 56.00 |
| | 8(ASP) | −101.0092 | 0.1477 | | |
| L4 | 9(ASP) | 9.8122 | 0.3053 | 1.635 | 23.90 |
| | 10(ASP) | 5.4776 | 0.3840 | | |
| L5 | 11(ASP) | 11.7603 | 0.9403 | 1.534 | 55.64 |
| | 12(ASP) | −2.5797 | 0.2817 | | |
| L6 | 13(ASP) | 2.6841 | 0.5000 | 1.534 | 55.64 |
| | 14(ASP) | 1.0355 | 0.6553 | | |
| (SG) | 15 | ∞ | 0.1100 | 1.514 | 51.40 |
| | 16 | ∞ | 0.2100 | | |
| (IMG) | 17 | ∞ | | | |

TABLE 2

Example 1

| | |
|---|---|
| f | 4.078 |
| Fno | 2.04 |
| Total Length | 5.138 |
| ω | 42.27 |
| f1 | 3.623 |
| f2 | −9.254 |
| f3 | 39.121 |
| f4 | −20.078 |
| f5 | 4.054 |
| f6 | −3.529 |

TABLE 3

Example 1

| | S3 | S4 | S5 | S6 | S7 | S8 |
|---|---|---|---|---|---|---|
| K | 0.1854 | 10.0000 | −10.0000 | −20.0000 | −10.0000 | 10.0000 |
| A3 | 0.00000E+00 | 0.00000E+00 | 0.00000E+00 | 0.00000E+00 | 0.00000E+00 | 0.00000E+00 |
| A4 | −4.91905E−03 | −3.89198E−02 | −3.24834E−02 | 7.53540E−02 | −2.22707E−02 | −7.00040E−02 |
| A5 | 0.00000E+00 | 0.00000E+00 | 0.00000E+00 | 0.00000E+00 | 0.00000E+00 | 0.00000E+00 |

TABLE 3-continued

Example 1

| | | | | | | |
|---|---|---|---|---|---|---|
| A6 | 8.54321E−03 | 2.32519E−02 | 5.50610E−02 | 9.76210E−02 | −4.55018E−02 | 2.80970E−03 |
| A7 | 0.00000E+00 | 0.00000E+00 | 0.00000E+00 | 0.00000E+00 | 0.00000E+00 | 0.00000E+00 |
| A8 | −2.81149E−02 | 6.33700E−03 | −2.59107E−02 | −6.33320E−01 | −1.40980E−03 | 4.80551E−02 |
| A9 | 0.00000E+00 | 0.00000E+00 | 0.00000E+00 | 0.00000E+00 | 0.00000E+00 | 0.00000E+00 |
| A10 | 1.50152E−02 | −3.11470E−02 | 9.04787E−02 | 1.86224E+00 | 4.49516E−02 | −1.41403E−01 |
| A11 | 0.00000E+00 | 0.00000E+00 | 0.00000E+00 | 0.00000E+00 | 0.00000E+00 | 0.00000E+00 |
| A12 | 2.10166E−03 | 1.21655E−02 | −1.41545E−01 | −2.73398E+00 | −1.11968E−01 | 7.52715E−02 |
| A13 | 0.00000E+00 | 0.00000E+00 | 0.00000E+00 | 0.00000E+00 | 0.00000E+00 | 0.00000E+00 |
| A14 | −9.92830E−03 | −5.96240E−03 | 1.01735E−01 | 2.05419E+00 | 7.88884E−02 | 9.70642E−03 |
| A15 | 0.00000E+00 | 0.00000E+00 | 0.00000E+00 | 0.00000E+00 | 0.00000E+00 | 0.00000E+00 |
| A16 | 0.00000E+00 | 0.00000E+00 | −2.90403E−02 | −6.13763E−01 | −5.66499E−03 | −1.00559E−02 |
| A17 | 0.00000E+00 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 | 0.00000E+00 |
| A19 | 0.00000E+00 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 | 0.00000E+00 |

| | S9 | S10 | S11 | S12 | S13 | S14 |
|---|---|---|---|---|---|---|
| K | −10.0000 | 6.9302 | −6.0808 | −10.0000 | −0.53270629 | −4.470897391 |
| A3 | −1.30856E−02 | 1.70150E−02 | −2.60402E−02 | −7.81351E−02 | −7.22126E−02 | 2.84679E−03 |
| A4 | −1.28097E−01 | −2.39961E−01 | 6.87895E−02 | 2.87084E−02 | −3.68533E−01 | −1.87579E−01 |
| A5 | −2.15121E−01 | 6.62364E−02 | −1.21795E−01 | −8.38635E−03 | 1.59454E−01 | 1.03387E−01 |
| A6 | 3.23619E−01 | 4.80865E−02 | 2.18297E−02 | −2.30130E−02 | 3.54963E−02 | 2.74824E−02 |
| A7 | 5.26506E−02 | 1.94121E−02 | 2.85880E−02 | 1.19549E−02 | −5.21882E−03 | −3.82901E−02 |
| A8 | −1.43381E−01 | −2.26108E−02 | 3.49684E−03 | 1.07275E−02 | −1.14167E−02 | 8.43315E−03 |
| A9 | −7.64090E−02 | −4.51467E−03 | −1.12540E−02 | −1.83035E−03 | 4.77335E−04 | 2.00284E−04 |
| A10 | 1.57153E−02 | −1.06240E−02 | −2.49101E−03 | −2.61353E−03 | 1.29271E−03 | 2.21149E−04 |
| A11 | 4.59260E−02 | 2.22176E−03 | 2.99706E−03 | −4.74795E−04 | 2.43223E−05 | 4.97873E−05 |
| A12 | 8.37891E−03 | 4.89549E−04 | −2.27216E−03 | −6.27555E−05 | −1.10982E−04 | −1.19196E−04 |
| A13 | 1.61446E−03 | 1.26199E−03 | 1.63351E−03 | 3.40627E−04 | 1.66015E−06 | −2.78027E−06 |
| A14 | −2.94210E−04 | 4.22124E−03 | −1.18608E−03 | 7.47762E−05 | 5.46284E−06 | 1.23514E−05 |
| A15 | −1.55504E−02 | 1.49329E−03 | 6.27788E−04 | −5.67150E−05 | −6.55294E−07 | −3.48218E−07 |
| A16 | −8.48047E−03 | −4.31687E−04 | 2.61491E−04 | −4.23616E−06 | 1.17427E−08 | −3.77253E−07 |
| A17 | 8.72838E−03 | −1.19841E−03 | −5.57477E−05 | 7.93983E−07 | 1.09989E−09 | −4.16696E−09 |
| A18 | 1.11889E−02 | −8.92957E−04 | −1.59742E−04 | 7.76129E−07 | −1.27282E−09 | 4.33598E−11 |
| A19 | 5.79253E−03 | −4.14969E−05 | −1.85844E−05 | −1.01528E−07 | −1.78785E−10 | 3.94055E−10 |
| A20 | −1.02873E−02 | 3.79747E−04 | 3.63910E−05 | 7.03531E−09 | 8.82465E−11 | 2.25099E−10 |

Various aberrations in Numerical example 1 described above are illustrated in FIG. 2. FIG. 2 illustrates, as the various aberrations, spherical aberration, astigmatism (field curvature), and distortion (distortion aberration). In the respective aberration diagrams, aberration with the d line (587.56 nm) as a reference wavelength is illustrated. In the spherical aberration diagram, aberration with respect to the g line (435.84 nm) and C line (656.27 nm) are also illustrated. In the aberration diagram of the astigmatism, a symbol "S" indicates a value of the aberration on a sagittal image plane, and a symbol "T" indicates a value of the aberration on a tangential image plane. The same applies to aberration diagrams in the following other Numerical examples.

As can be seen from the above-described aberration diagrams, the imaging lens is favorably corrected in various aberrations while being small-sized, and has excellent optical performance.

Numerical Example 2

Table 4 shows lens data of Numerical example 2 in which specific numerical values are applied to the imaging lens 2 illustrated in FIG. 3. In addition, Table 5 shows values of the focal length f of the entire system, the F number Fno, the total length, and the half angle of view ω. Table 5 also shows values of the focal length f1 of the first lens, the focal length f2 of the second lens, the focal length f3 of the third lens, the focal length f4 of the fourth lens, the focal length f5 of the fifth lens, and the focal length f6 of the sixth lens. As illustrated in the numerical data, the fourth lens L4 has negative refractive power near the optical axis, in the imaging lens 2 illustrated in FIG. 3.

In addition, all of the first lens L1 to the sixth lens L6 are plastic lenses.

In the imaging lens 2, both surfaces of each of the first lens L1 to the sixth lens L6 have aspheric shapes. Table 6 shows values of aspheric surface coefficients A3 to A20 in the aspheric surfaces, together with the values of the coefficient K.

TABLE 4

Example 2

| Lens | Si | Ri | Di | Ndi | Ndi |
|---|---|---|---|---|---|
| (Virtual Surface) | 1 | ∞ | 0.2900 | | |
| (St) | 2(STO) | ∞ | −0.2900 | | |
| L1 | 3(ASP) | 1.6864 | 0.5825 | 1.543 | 56.00 |
| | 4(ASP) | 7.5554 | 0.0353 | | |
| L2 | 5(ASP) | 7.4324 | 0.2170 | 1.650 | 21.50 |
| | 6(ASP) | 3.2125 | 0.3001 | | |
| L3 | 7(ASP) | 5.5000 | 0.4000 | 1.543 | 56.00 |
| | 8(ASP) | 9.0000 | 0.1934 | | |
| L4 | 9(ASP) | 11.0182 | 0.3497 | 1.635 | 23.90 |
| | 10(ASP) | 5.4753 | 0.3734 | | |
| L5 | 11(ASP) | 19.4337 | 0.7500 | 1.534 | 55.64 |
| | 12(ASP) | −2.6309 | 0.4440 | | |
| L6 | 13(ASP) | 2.1983 | 0.5000 | 1.534 | 55.64 |
| | 14(ASP) | 1.0320 | 0.6536 | | |
| (SG) | 15 | ∞ | 0.1100 | 1.514 | 51.40 |
| | 16 | ∞ | 0.2100 | | |
| (IMG) | 17 | ∞ | | | |

TABLE 5

Example 2

| | |
|---|---|
| f | 4.078 |
| Fno | 2.04 |
| Total Length | 5.119 |
| ω | 42.28 |
| f1 | 3.862 |
| f2 | −8.879 |
| f3 | 25.029 |
| f4 | −17.572 |
| f5 | 4.390 |
| f6 | −4.281 |

TABLE 6

Example 2

| | S3 | S4 | S5 | S6 | S7 | S8 |
|---|---|---|---|---|---|---|
| K | 0.1862 | 10.0000 | −10.0000 | −20.0000 | −10.0000 | 10.0000 |
| A3 | 0.00000E+00 | 0.00000E+00 | 0.00000E+00 | 0.00000E+00 | 0.00000E+00 | 0.00000E+00 |
| A4 | −4.47104E−03 | −3.67860E−02 | −2.64303E−02 | 6.33600E−02 | −2.47859E−02 | −6.90463E−02 |
| A5 | 0.00000E+00 | 0.00000E+00 | 0.00000E+00 | 0.00000E+00 | 0.00000E+00 | 0.00000E+00 |
| A6 | 3.96930E−03 | 1.70733E−02 | 6.22339E−02 | 1.21291E−01 | −4.22195E−02 | −3.66563E−04 |
| A7 | 0.00000E+00 | 0.00000E+00 | 0.00000E+00 | 0.00000E+00 | 0.00000E+00 | 0.00000E+00 |
| A8 | −2.42993E−02 | 1.18524E−03 | −3.17679E−02 | −6.50193E−01 | −9.77448E−05 | 4.86310E−02 |
| A9 | 0.00000E+00 | 0.00000E+00 | 0.00000E+00 | 0.00000E+00 | 0.00000E+00 | 0.00000E+00 |
| A10 | 1.22880E−02 | −3.10544E−02 | 9.39899E−02 | 1.87261E+00 | 4.17555E−02 | −1.40687E−01 |
| A11 | 0.00000E+00 | 0.00000E+00 | 0.00000E+00 | 0.00000E+00 | 0.00000E+00 | 0.00000E+00 |
| A12 | −1.40306E−04 | 1.21655E−02 | −1.41545E−01 | −2.73398E+00 | −1.11968E−01 | 7.57128E−02 |
| A13 | 0.00000E+00 | 0.00000E+00 | 0.00000E+00 | 0.00000E+00 | 0.00000E+00 | 0.00000E+00 |
| A14 | −9.92830E−03 | −5.96240E−03 | 1.01735E−01 | 2.05419E+00 | 7.88884E−02 | 9.70642E−03 |
| A15 | 0.00000E+00 | 0.00000E+00 | 0.00000E+00 | 0.00000E+00 | 0.00000E+00 | 0.00000E+00 |
| A16 | 0.00000E+00 | 0.00000E+00 | −2.90403E−02 | −6.13763E−01 | −5.66499E−03 | −1.00559E−02 |
| A17 | 0.00000E+00 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 | 0.00000E+00 |
| A19 | 0.00000E+00 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 | 0.00000E+00 |

| | S9 | S10 | S11 | S12 | S13 | S14 |
|---|---|---|---|---|---|---|
| K | −10.0000 | 4.6949 | 9.8225 | −10.0000 | −0.587987207 | −4.154770973 |
| A3 | −1.13719E−02 | 2.49178E−02 | −3.31438E−02 | −8.95595E−02 | −8.87534E−02 | −1.45184E−02 |
| A4 | −1.15355E−01 | −2.45427E−02 | 5.66494E−02 | 1.25414E−01 | −3.67667E−01 | −1.79081E−01 |
| A5 | −2.31897E−01 | 6.81291E−02 | −1.32709E−01 | 3.63944E−03 | 1.58346E−01 | 1.04474E−01 |
| A6 | 3.18747E−01 | 4.83286E−02 | 2.45388E−02 | −2.78459E−02 | 3.54229E−02 | 2.65325E−02 |
| A7 | 5.68636E−02 | 1.98696E−02 | 2.96795E−02 | 9.16563E−03 | −5.21647E−03 | −3.84963E−02 |
| A8 | −1.38400E−01 | −2.23271E−02 | 3.41498E−03 | 1.07219E−02 | −1.14088E−02 | 8.44647E−03 |
| A9 | −7.43200E−02 | −4.29297E−03 | −1.16784E−02 | −1.30020E−03 | 4.78819E−04 | 2.23799E−04 |
| A10 | 1.51581E−02 | −1.04350E−02 | −2.41092E−03 | −2.35417E−03 | 1.29286E−03 | 2.28382E−04 |
| A11 | 4.43460E−02 | 2.34532E−03 | 3.21690E−03 | −3.99661E−04 | 2.43831E−05 | 5.15144E−05 |
| A12 | 7.10352E−03 | 4.90411E−04 | −2.14622E−03 | −4.29781E−05 | −1.10965E−04 | −1.18969E−04 |
| A13 | 1.12871E−03 | 1.17633E−03 | 1.67470E−03 | 3.48817E−04 | 1.65483E−06 | −2.87487E−06 |
| A14 | 1.06492E−05 | 4.12482E−03 | −1.21865E−03 | 8.09967E−05 | 5.45784E−06 | 1.23073E−05 |
| A15 | −1.48635E−02 | 1.43481E−03 | 5.94192E−04 | −5.35468E−05 | −6.57427E−07 | −3.62891E−07 |
| A16 | −7.65909E−03 | −4.67111E−04 | 2.37831E−04 | −4.42238E−06 | 1.12769E−08 | −3.81498E−07 |
| A17 | 9.28444E−03 | −1.20397E−03 | −6.86480E−05 | 6.25376E−07 | 8.42301E−10 | −5.32011E−09 |
| A18 | 1.14224E−02 | −8.79235E−04 | −1.63554E−04 | 4.81564E−07 | −1.38127E−09 | −5.68845E−11 |
| A19 | 5.46667E−03 | −4.14674E−05 | −1.37430E−05 | −3.47317E−07 | −1.58601E−10 | 4.81453E−10 |
| A20 | −1.08552E−02 | 3.86562E−04 | 4.36753E−05 | −1.77522E−07 | 9.74522E−11 | 2.72376E−10 |

Various aberrations in Numerical example 2 described above are illustrated in FIG. 4. As can be seen from the aberration diagrams, the imaging lens is favorably corrected in various aberrations while being small-sized, and has excellent optical performance.

Numerical Example 3

Table 7 shows lens data of Numerical example 3 in which specific numerical values are applied to the imaging lens 3 illustrated in FIG. 5. In addition, Table 8 shows values of the focal length f of the entire system, the F number Fno, the total length, and the half angle of view ω. Table 8 also shows values of the focal length f1 of the first lens, the focal length f2 of the second lens, the focal length f3 of the third lens, the focal length f4 of the fourth lens, the focal length f5 of the fifth lens, and the focal length f6 of the sixth lens. As illustrated in the numerical data, the fourth lens L4 has negative refractive power near the optical axis, in the imaging lens 3 illustrated in FIG. 5.

In addition, all of the first lens L1 to the sixth lens L6 are plastic lenses.

In the imaging lens 3, both surfaces of each of the first lens L1 to the sixth lens L6 have aspheric shapes. Table 9 shows values of aspheric surface coefficients A3 to A20 in the aspheric surfaces, together with the values of the coefficient K.

TABLE 7

Example 3

| Lens | Si | Ri | Di | Ndi | vdi |
|---|---|---|---|---|---|
| (Virtual Surface) (St) | 1 | ∞ | 0.2900 | | |
| | 2(STO) | ∞ | −0.2900 | | |
| L1 | 3(ASP) | 1.7080 | 0.5971 | 1.543 | 56.00 |
| | 4(ASP) | 8.9786 | 0.0301 | | |
| L2 | 5(ASP) | 7.1310 | 0.2100 | 1.650 | 21.50 |
| | 6(ASP) | 3.5792 | 0.3704 | | |

TABLE 7-continued

Example 3

| Lens | Si | Ri | Di | Ndi | vdi |
|---|---|---|---|---|---|
| L3 | 7(ASP) | −100.0000 | 0.4041 | 1.543 | 56.00 |
|  | 8(ASP) | −9.0000 | 0.1875 |  |  |
| L4 | 9(ASP) | −100.0000 | 0.3035 | 1.635 | 23.90 |
|  | 10(ASP) | 6.0000 | 0.3150 |  |  |
| L5 | 11(ASP) | 4.7618 | 0.8564 | 1.534 | 55.64 |
|  | 12(ASP) | −5.0212 | 0.3803 |  |  |
| L6 | 13(ASP) | 2.2802 | 0.5171 | 1.534 | 55.64 |
|  | 14(ASP) | 1.0763 | 0.6223 |  |  |
| (SG) | 15 | ∞ | 0.1100 | 1.514 | 51.40 |
|  | 16 | ∞ | 0.2100 |  |  |
| (IMG) | 17 | ∞ |  |  |  |

TABLE 8-continued

Example 3

| Total Length | 5.114 |
|---|---|
| ω | 42.15 |
| f1 | 3.774 |
| f2 | −11.312 |
| f3 | 18.179 |
| f4 | −8.905 |
| f5 | 4.720 |
| f6 | −4.488 |

TABLE 9

Example 3

|  | S3 | S4 | S5 | S6 | S7 | S8 |
|---|---|---|---|---|---|---|
| K | 0.3065 | 10.0000 | −10.0000 | −20.0000 | −10.0000 | 10.0000 |
| A3 | 0.00000E+00 | 0.00000E+00 | 0.00000E+00 | 0.00000E+00 | 0.00000E+00 | 0.00000E+00 |
| A4 | −7.05820E−03 | −6.38476E−02 | −5.21529E−02 | 5.20935E−02 | −2.27788E−02 | −2.75904E−02 |
| A5 | 0.00000E+00 | 0.00000E+00 | 0.00000E+00 | 0.00000E+00 | 0.00000E+00 | 0.00000E+00 |
| A6 | 3.52526E−03 | 3.38013E−02 | 6.05544E−02 | 1.19997E−01 | −6.83264E−02 | −5.17803E−02 |
| A7 | 0.00000E+00 | 0.00000E+00 | 0.00000E+00 | 0.00000E+00 | 0.00000E+00 | 0.00000E+00 |
| A8 | −1.53870E−02 | 9.56132E−03 | −2.65002E−02 | −6.57786E−01 | 1.52911E−02 | 6.37321E−02 |
| A9 | 0.00000E+00 | 0.00000E+00 | 0.00000E+00 | 0.00000E+00 | 0.00000E+00 | 0.00000E+00 |
| A10 | 8.86155E−04 | −3.02009E−02 | 9.53445E−02 | 1.86966E+00 | 2.57048E−02 | −1.35951E−01 |
| A11 | 0.00000E+00 | 0.00000E+00 | 0.00000E+00 | 0.00000E+00 | 0.00000E+00 | 0.00000E+00 |
| A12 | 7.76848E−03 | 1.21634E−02 | −1.41543E−01 | −2.73399E+00 | −1.11962E−01 | 6.92637E−02 |
| A13 | 0.00000E+00 | 0.00000E+00 | 0.00000E+00 | 0.00000E+00 | 0.00000E+00 | 0.00000E+00 |
| A14 | −9.92780E−03 | −5.96450E−03 | 1.01738E−01 | 2.05418E+00 | 7.88946E−02 | 9.70527E−03 |
| A15 | 0.00000E+00 | 0.00000E+00 | 0.00000E+00 | 0.00000E+00 | 0.00000E+00 | 0.00000E+00 |
| A16 | 0.00000E+00 | 0.00000E+00 | −2.90373E−02 | −6.13772E−01 | −5.86570E−03 | −1.00568E−02 |
| A17 | 0.00000E+00 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 | 0.00000E+00 |
| A19 | 0.00000E+00 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 | 0.00000E+00 |

|  | S9 | S10 | S11 | S12 | S13 | S14 |
|---|---|---|---|---|---|---|
| K | −10.0000 | 9.5075 | −10.0000 | −10.0000 | −0.447771547 | −4.924786173 |
| A3 | −2.77597E−02 | −1.76152E−02 | −5.49318E−02 | −1.18381E−01 | −1.24821E−01 | 5.67783E−04 |
| A4 | −6.32365E−02 | −2.18159E−01 | 4.95781E−02 | 7.63203E−02 | −3.62666E−01 | −1.88140E−01 |
| A5 | −2.11496E−01 | 7.56574E−02 | −1.02631E−01 | −1.37179E−02 | 1.62783E−01 | 1.03969E−01 |
| A6 | 3.05270E−01 | 4.72510E−02 | 2.57047E−02 | −3.31616E−02 | 3.58272E−02 | 2.75572E−02 |
| A7 | 4.17223E−02 | 1.68021E−02 | 2.50759E−02 | 1.10495E−02 | −5.33654E−03 | −3.83354E−02 |
| A8 | −1.45897E−01 | −2.48059E−02 | 1.37128E−03 | 1.24318E−02 | −1.14808E−02 | 8.41226E−03 |
| A9 | −7.54290E−02 | −5.29486E−03 | −1.15023E−02 | −1.18266E−03 | 4.55376E−04 | 1.97094E−04 |
| A10 | 1.77049E−02 | −1.06246E−02 | −2.15309E−03 | −2.62945E−03 | 1.28684E−03 | 2.20750E−04 |
| A11 | 4.80121E−02 | 2.43855E−03 | 3.33468E−03 | −5.43922E−04 | 2.31832E−05 | 5.01621E−05 |
| A12 | 9.83497E−03 | 7.90291E−04 | −2.16573E−03 | −1.10460E−04 | −1.11033E−04 | −1.19023E−04 |
| A13 | 2.74373E−03 | 1.38992E−03 | 1.63743E−03 | 3.31770E−04 | 1.74808E−06 | −2.77411E−06 |
| A14 | 3.50386E−04 | 4.25899E−03 | −1.21665E−03 | 7.51857E−05 | 5.51252E−06 | 1.23503E−05 |
| A15 | −1.59145E−02 | 1.51617E−03 | 6.03104E−04 | −5.59552E−05 | −6.35391E−07 | −3.48938E−07 |
| A16 | −9.63336E−03 | −4.46098E−04 | 2.50447E−04 | −3.32761E−06 | 1.82722E−08 | −3.77619E−07 |
| A17 | 7.45056E−03 | −1.20674E−03 | −5.83607E−05 | 1.36735E−06 | 2.56254E−09 | −4.44509E−09 |
| A18 | 1.06510E−02 | −8.94374E−04 | −1.59892E−04 | 9.16569E−07 | −1.23786E−09 | 3.45289E−11 |
| A19 | 6.16262E−03 | −4.75113E−05 | −1.71562E−05 | −1.33993E−07 | −3.81043E−10 | 4.13092E−10 |
| A20 | −9.63601E−03 | 3.78949E−04 | 3.79640E−05 | −4.42119E−08 | −7.32806E−11 | 2.34738E−10 |

TABLE 8

Example 3

| f | 4.093 |
|---|---|
| Fno | 2.04 |

Various aberrations in Numerical example 3 described above are illustrated in FIG. 6. As can be seen from the aberration diagrams, the imaging lens is favorably corrected in various aberrations while being small-sized, and has excellent optical performance.

Numerical Example 4

Table 10 shows lens data of Numerical example 4 in which specific numerical values are applied to the imaging lens 4 illustrated in FIG. 7. In addition, Table 11 shows values of the focal length f of the entire system, the F number Fno, the total length, and the half angle of view ω. Table 11 also shows values of the focal length f1 of the first lens, the focal length f2 of the second lens, the focal length f3 of the third lens, the focal length f4 of the fourth lens, the focal length f5 of the fifth lens, and the focal length f6 of the sixth lens. As illustrated in the numerical data, the fourth lens L4 has negative refractive power near the optical axis, in the imaging lens 4 illustrated in FIG. 7.

In addition, all of the first lens L1 to the sixth lens L6 are plastic lenses.

In the imaging lens 4, both surfaces of each of the first lens L1 to the sixth lens L6 have aspheric shapes. Table 12 shows values of aspheric surface coefficients A3 to A20 in the aspheric surfaces, together with the values of the coefficient K.

TABLE 10

| Example 4 | | | | | |
|---|---|---|---|---|---|
| Lens | Si | Ri | Di | Ndi | vdi |
| (Virtual Surface) | 1 | ∞ | 0.2900 | | |
| (St) | 2(STO) | ∞ | −0.2900 | | |
| L1 | 3(ASP) | 1.7445 | 0.5931 | 1.543 | 56.00 |
| | 4(ASP) | 10.9151 | 0.0301 | | |

TABLE 10-continued

| Example 4 | | | | | |
|---|---|---|---|---|---|
| Lens | Si | Ri | Di | Ndi | vdi |
| L2 | 5(ASP) | 6.8447 | 0.2170 | 1.650 | 21.50 |
| | 6(ASP) | 3.4284 | 0.3764 | | |
| L3 | 7(ASP) | −28.9748 | 0.4242 | 1.543 | 56.00 |
| | 8(ASP) | −7.3877 | 0.1513 | | |
| L4 | 9(ASP) | −7.9000 | 0.3096 | 1.635 | 23.90 |
| | 10(ASP) | −100.0000 | 0.3750 | | |
| L5 | 11(ASP) | 15.9557 | 0.8963 | 1.534 | 55.64 |
| | 12(ASP) | −2.4183 | 0.3457 | | |
| L6 | 13(ASP) | 2.9403 | 0.5000 | 1.534 | 55.64 |
| | 14(ASP) | 1.0306 | 0.6619 | | |
| (SG) | 15 | ∞ | 0.1100 | 1.514 | 51.40 |
| | 16 | ∞ | 0.2100 | | |
| (IMG) | 17 | ∞ | | | |

TABLE 11

| Example 4 | |
|---|---|
| f | 4.086 |
| Fno | 2.04 |
| Total Length | 5.201 |
| ω | 42.98 |
| f1 | 3.737 |
| f2 | −10.832 |
| f3 | 18.129 |
| f4 | −13.527 |
| f5 | 4.000 |
| f6 | −3.269 |

TABLE 12

| Example 4 | | | | | | |
|---|---|---|---|---|---|---|
| | S3 | S4 | S5 | S6 | S7 | S8 |
| K | 0.2815 | 10.0000 | −10.0000 | −20.0000 | −10.0000 | 10.0000 |
| A3 | 0.00000E+00 | 0.00000E+00 | 0.00000E+00 | 0.00000E+00 | 0.00000E+00 | 0.00000E+00 |
| A4 | −3.93972E−03 | −4.13208E−02 | −4.42428E−02 | 4.56806E−02 | −3.89074E−02 | −5.95507E−02 |
| A5 | 0.00000E+00 | 0.00000E+00 | 0.00000E+00 | 0.00000E+00 | 0.00000E+00 | 0.00000E+00 |
| A6 | 5.18831E−03 | 2.97435E−02 | 5.96834E−02 | 1.12937E−01 | −5.01038E−02 | −3.37833E−02 |
| A7 | 0.00000E+00 | 0.00000E+00 | 0.00000E+00 | 0.00000E+00 | 0.00000E+00 | 0.00000E+00 |
| A8 | −1.53918E−02 | 1.01914E−02 | −3.17152E−02 | −6.48173E−01 | 1.25191E−02 | 6.18688E−02 |
| A9 | 0.00000E+00 | 0.00000E+00 | 0.00000E+00 | 0.00000E+00 | 0.00000E+00 | 0.00000E+00 |
| A10 | 3.63792E−03 | −3.31381E−02 | 8.88178E−02 | 1.85621E+00 | 2.65621E−02 | −1.38505E−01 |
| A11 | 0.00000E+00 | 0.00000E+00 | 0.00000E+00 | 0.00000E+00 | 0.00000E+00 | 0.00000E+00 |
| A12 | 8.95899E−03 | 1.21655E−02 | −1.41545E−01 | −2.73398E+00 | −1.11968E−01 | 7.11882E−02 |
| A13 | 0.00000E+00 | 0.00000E+00 | 0.00000E+00 | 0.00000E+00 | 0.00000E+00 | 0.00000E+00 |
| A14 | −9.92830E−03 | −5.96240E−03 | 1.01735E−01 | 2.05419E+00 | 7.88884E−02 | 9.70643E−03 |
| A15 | 0.00000E+00 | 0.00000E+00 | 0.00000E+00 | 0.00000E+00 | 0.00000E+00 | 0.00000E+00 |
| A16 | 0.00000E+00 | 0.00000E+00 | −2.90403E−02 | −6.13763E−01 | −5.66499E−03 | −1.00559E−02 |
| A17 | 0.00000E+00 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 | 0.00000E+00 |
| A19 | 0.00000E+00 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 | 0.00000E+00 |
| | S9 | S10 | S11 | S12 | S13 | S14 |
| K | −10.0000 | −10.0000 | −2.9210 | −10.0000 | −0.2931 | −4.7423 |
| A3 | 1.25574E−02 | 4.86687E−02 | −1.42452E−02 | −6.74932E−02 | −7.56212E−02 | 8.18211E−03 |
| A4 | −1.10912E−01 | −2.29810E−01 | 5.05845E−02 | 8.23228E−03 | −3.61372E−01 | −1.89708E−01 |
| A5 | −2.24718E−01 | 6.59529E−02 | −1.24648E−01 | −1.66713E−01 | 1.59178E−01 | 1.05292E−01 |
| A6 | 3.15434E−01 | 4.35824E−02 | 2.41933E−02 | −2.64884E−02 | 3.53172E−01 | 2.70910E−02 |
| A7 | 4.63948E−02 | 1.77977E−02 | 2.94356E−02 | 1.00344E−02 | −5.28136E−03 | −3.83388E−02 |
| A8 | −1.48978E−01 | −2.29959E−02 | 3.59423E−03 | 1.14376E−02 | −1.14312E−02 | 8.44105E−03 |
| A9 | −7.99582E−02 | −3.98825E−03 | −1.12878E−02 | −1.29033E−02 | 4.75087E−04 | 2.07354E−04 |
| A10 | 1.49993E−02 | −1.00955E−02 | −2.53888E−03 | −2.43307E−03 | 1.29255E−03 | 2.21843E−04 |
| A11 | 4.73794E−02 | 2.62381E−03 | 3.00579E−03 | −4.50935E−04 | 2.44622E−05 | 4.98320E−05 |
| A12 | 1.09072E−02 | 6.54043E−04 | −2.30299E−03 | −8.54151E−05 | −1.10886E−04 | −1.19202E−04 |
| A13 | 4.39912E−03 | 1.22115E−03 | 1.61899E−03 | 3.31411E−04 | 1.69055E−06 | −2.81032E−06 |
| A14 | 2.36198E−03 | 4.15713E−03 | −1.19329E−03 | 7.14638E−05 | 5.46937E−06 | 1.23497E−05 |
| A15 | −1.42414E−02 | 1.45367E−03 | 6.28880E−04 | −5.82558E−05 | −6.54776E−07 | −3.46210E−07 |

TABLE 12-continued

| | | | Example 4 | | | |
|---|---|---|---|---|---|---|
| A16 | −8.51146E−03 | −4.90237E−04 | 2.66816E−04 | −4.45364E−06 | 1.16059E−08 | −3.76497E−07 |
| A17 | 7.88757E−03 | −1.21392E−03 | −5.12530E−05 | 7.78191E−07 | 8.68455E−10 | −4.09257E−09 |
| A18 | 1.03412E−02 | −8.96049E−04 | −1.58570E−04 | 8.27316E−07 | −1.40418E−09 | 6.54674E−11 |
| A19 | 4.98954E−03 | −2.48164E−05 | −1.84661E−05 | −8.16602E−08 | −1.92416E−10 | 3.84650E−10 |
| A20 | −1.03297E−02 | 3.98869E−04 | 3.57206E−05 | 1.21930E−08 | 9.35782E−11 | 2.14060E−10 |

Various aberrations in Numerical example 4 described above are illustrated in FIG. 8. As can be seen from the aberration diagrams, the imaging lens is favorably corrected in various aberrations while being small-sized, and has excellent optical performance.

Numerical Example 5

Table 13 shows lens data of Numerical example 5 in which specific numerical values are applied to the imaging lens 5 illustrated in FIG. 9. In addition, Table 14 shows values of the focal length f of the entire system, the F number Fno, the total length, and the half angle of view ω. Table 14 also shows values of the focal length f1 of the first lens, the focal length f2 of the second lens, the focal length f3 of the third lens, the focal length f4 of the fourth lens, the focal length f5 of the fifth lens, and the focal length f6 of the sixth lens. As illustrated in the numerical data, the fourth lens L4 has negative refractive power near the optical axis, in the imaging lens 5 illustrated in FIG. 9.

In addition, all of the first lens L1 to the sixth lens L6 are plastic lenses.

In the imaging lens 5, both surfaces of each of the first lens L1 to the sixth lens L6 have aspheric shapes. Table 15 shows values of aspheric surface coefficients A3 to A20 in the aspheric surfaces, together with the values of the coefficient K.

TABLE 13

| | Example 5 | | | | |
|---|---|---|---|---|---|
| Lens | Si | Ri | Di | Ndi | νdi |
| (Virtual Surface) | 1 | ∞ | 0.290 | | |
| (St) | 2(STO) | ∞ | −0.290 | | |

TABLE 13-continued

| | Example 5 | | | | |
|---|---|---|---|---|---|
| Lens | Si | Ri | Di | Ndi | νdi |
| L1 | 3(ASP) | 1.722 | 0.604 | 1.543 | 56.00 |
|  | 4(ASP) | 17.431 | 0.030 | | |
| L2 | 5(ASP) | 7.3719 | 0.217 | 1.650 | 21.50 |
|  | 6(ASP) | 3.0671 | 0.370 | | |
| L3 | 7(ASP) | −61.5151 | 0.400 | 1.543 | 56.00 |
|  | 8(ASP) | −31.2110 | 0.138 | | |
| L4 | 9(ASP) | 7.4295 | 0.332 | 1.635 | 23.90 |
|  | 10(ASP) | 4.4325 | 0.335 | | |
| L5 | 11(ASP) | 11.9946 | 0.720 | 1.534 | 55.64 |
|  | 12(ASP) | −2.4448 | 0.565 | | |
| L6 | 13(ASP) | 3.7063 | 0.470 | 1.534 | 55.64 |
|  | 14(ASP) | 1.1708 | 0.580 | | |
| (SG) | 15 | ∞ | 0.110 | 1.514 | 51.40 |
|  | 16 | ∞ | 0.210 | | |
| (IMG) | 17 | ∞ | | | |

TABLE 14

| Example 5 | |
|---|---|
| f | 4.085 |
| Fno | 2.04 |
| Total Length | 5.080 |
| ω | 43.05 |
| f1 | 3.470 |
| f2 | −8.239 |
| f3 | 116.095 |
| f4 | −18.084 |
| f5 | 3.870 |
| f6 | −3.425 |

TABLE 15

| | Example 5 | | | | | |
|---|---|---|---|---|---|---|
| | S3 | S4 | S5 | S6 | S7 | S8 |
| K | 0.1628 | 10.0000 | −10.0000 | −20.0000 | −10.0000 | 10.0000 |
| A3 | 0.00000E+00 | 0.00000E+00 | 0.00000E+00 | 0.00000E+00 | 0.00000E+00 | 0.00000E+00 |
| A4 | −4.86590E−03 | −2.09606E−02 | −2.20114E−02 | 7.45178E−02 | −1.73509E−02 | −6.61809E−02 |
| A5 | 0.00000E+00 | 0.00000E+00 | 0.00000E+00 | 0.00000E+00 | 0.00000E+00 | 0.00000E+00 |
| A6 | 1.32146E−02 | 1.93505E−02 | 4.83575E−02 | 9.21614E−02 | −6.00548E−02 | −1.04208E−02 |
| A7 | 0.00000E+00 | 0.00000E+00 | 0.00000E+00 | 0.00000E+00 | 0.00000E+00 | 0.00000E+00 |
| A8 | −3.67945E−02 | −3.11485E−03 | −3.96278E−02 | −6.38556E−01 | 1.38364E−02 | 4.86908E−02 |
| A9 | 0.00000E+00 | 0.00000E+00 | 0.00000E+00 | 0.00000E+00 | 0.00000E+00 | 0.00000E+00 |
| A10 | 2.67131E−02 | −2.70219E−02 | 9.45418E−02 | 1.85991E+00 | 3.26878E−02 | −1.35727E−01 |
| A11 | 0.00000E+00 | 0.00000E+00 | 0.00000E+00 | 0.00000E+00 | 0.00000E+00 | 0.00000E+00 |
| A12 | −2.07351E−03 | 1.21655E−02 | −1.41545E−01 | −2.73398E+00 | −1.04093E−01 | 7.71134E−02 |
| A13 | 0.00000E+00 | 0.00000E+00 | 0.00000E+00 | 0.00000E+00 | 0.00000E+00 | 0.00000E+00 |
| A14 | −9.92828E−03 | −5.96243E−03 | 1.01735E−01 | 2.05419E+00 | 7.90389E−02 | 9.52464E−03 |
| A15 | 0.00000E+00 | 0.00000E+00 | 0.00000E+00 | 0.00000E+00 | 0.00000E+00 | 0.00000E+00 |
| A16 | 0.00000E+00 | 0.00000E+00 | −2.90403E−02 | −6.13763E−01 | −5.66629E−03 | −1.02280E−02 |
| A17 | 0.00000E+00 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 | 0.00000E+00 |
| A19 | 0.00000E+00 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 | 0.00000E+00 |

TABLE 15-continued

Example 5

| | S9 | S10 | S11 | S12 | S13 | S14 |
|---|---|---|---|---|---|---|
| K | −10.0000 | 0.5526 | 9.9966 | −8.3059 | 0.2723 | −8.0033 |
| A3 | −8.47332E−04 | 2.29791E−02 | −1.81143E−02 | −6.34832E−02 | −1.08800E−01 | 5.96387E−02 |
| A4 | −1.76463E−01 | −2.61411E−01 | 2.26706E−02 | 2.10167E−03 | −3.24152E−01 | −2.24754E−01 |
| A5 | −1.54928E−01 | 8.27372E−02 | −1.06287E−01 | −2.25449E−03 | 1.55031E−01 | 1.09051E−01 |
| A6 | 3.19294E−01 | 5.07384E−02 | 3.39860E−02 | −2.27436E−02 | 3.37707E−02 | 2.83634E−02 |
| A7 | 1.73265E−02 | 1.41190E−02 | 2.94021E−02 | 1.22716E−02 | −5.53883E−03 | −3.82697E−02 |
| A8 | −1.64588E−01 | −2.99821E−02 | 5.20691E−04 | 1.20061E−02 | −1.14338E−02 | 8.40073E−03 |
| A9 | −7.57615E−02 | −7.80697E−03 | −1.32349E−02 | −1.13261E−03 | 4.91083E−04 | 1.94940E−04 |
| A10 | 2.83133E−02 | −9.80218E−03 | −3.03724E−03 | −2.31183E−03 | 1.29909E−03 | 2.16244E−04 |
| A11 | 5.81984E−02 | 3.48741E−03 | 3.04846E−03 | −6.11774E−04 | 2.63462E−05 | 4.92967E−05 |
| A12 | 1.36016E−02 | 1.62445E−03 | −1.99515E−03 | −1.72260E−04 | −1.10439E−04 | −1.19146E−04 |
| A13 | 9.62550E−04 | 2.01220E−03 | 1.79793E−03 | 2.81394E−04 | 1.74156E−06 | −2.76325E−06 |
| A14 | −3.49911E−03 | 4.39038E−03 | −1.11006E−03 | 6.09180E−05 | 5.44795E−06 | 1.23642E−05 |
| A15 | −1.86706E−02 | 1.48247E−03 | 6.67673E−04 | −5.62465E−05 | −6.66036E−07 | −3.39262E−07 |
| A16 | −1.00859E−02 | −4.92651E−04 | 2.76693E−04 | 6.43975E−07 | 7.39889E−09 | −3.74449E−07 |
| A17 | 9.33140E−03 | −1.25568E−03 | −5.42444E−05 | 3.57480E−06 | −8.02443E−10 | −3.75678E−09 |
| A18 | 1.25272E−02 | −9.58580E−04 | −1.62684E−04 | 1.62846E−06 | −1.79188E−09 | 2.24776E−10 |
| A19 | 7.47234E−03 | −5.51214E−05 | −2.36106E−05 | −1.39081E−07 | −1.61528E−10 | 3.44664E−10 |
| A20 | −1.17022E−02 | 3.90407E−04 | 3.30502E−05 | −2.84321E−07 | 1.68421E−10 | 1.93676E−10 |

Various aberrations in Numerical example 5 described above are illustrated in FIG. 10. As can be seen from the aberration diagrams, the imaging lens is favorably corrected in various aberrations while being small-sized, and has excellent optical performance.

Numerical Example 6

Table 16 shows lens data of Numerical example 6 in which specific numerical values are applied to the imaging lens 6 illustrated in FIG. 11. In addition, Table 17 shows values of the focal length f of the entire system, the F number Fno, the total length, and the half angle of view ω. Table 17 also shows values of the focal length f1 of the first lens, the focal length f2 of the second lens, the focal length f3 of the third lens, the focal length f4 of the fourth lens, the focal length f5 of the fifth lens, and the focal length f6 of the sixth lens. As illustrated in the numerical data, the fourth lens L4 has negative refractive power near the optical axis, in the imaging lens 6 illustrated in FIG. 11.

In addition, all of the first lens L1 to the sixth lens L6 are plastic lenses.

In the imaging lens 6, both surfaces of each of the first lens L1 to the sixth lens L6 have aspheric shapes. Table 18 shows values of aspheric surface coefficients A3 to A20 in the aspheric surfaces, together with the values of the coefficient K.

TABLE 16

Example 6

| Lens | Si | Ri | Di | Ndi | vdi |
|---|---|---|---|---|---|
| (Virtual Surface) | 1 | ∞ | 0.290 | | |
| (St) | 2(STO) | ∞ | −0.290 | | |

TABLE 16-continued

Example 6

| Lens | Si | Ri | Di | Ndi | vdi |
|---|---|---|---|---|---|
| L1 | 3(ASP) | 1.7219 | 0.604 | 1.543 | 56.00 |
| | 4(ASP) | 17.4305 | 0.030 | | |
| L2 | 5(ASP) | 7.3719 | 0.217 | 1.650 | 21.50 |
| | 6(ASP) | 3.0671 | 0.370 | | |
| L3 | 7(ASP) | −60.5436 | 0.400 | 1.543 | 56.00 |
| | 8(ASP) | −34.4443 | 0.105 | | |
| L4 | 9(ASP) | 7.5087 | 0.310 | 1.635 | 23.90 |
| | 10(ASP) | 5.8042 | 0.377 | | |
| L5 | 11(ASP) | −100.0000 | 0.725 | 1.534 | 55.64 |
| | 12(ASP) | −2.8342 | 0.373 | | |
| L6 | 13(ASP) | 2.1506 | 0.592 | 1.534 | 55.64 |
| | 14(ASP) | 1.0567 | 0.679 | | |
| (SG) | 15 | ∞ | 0.110 | 1.514 | 51.40 |
| | 16 | ∞ | 0.210 | | |
| (IMG) | 17 | ∞ | | | |

TABLE 17

Example 6

| f | 4.087 |
|---|---|
| Fno | 2.04 |
| Total Length | 5.101 |
| ω | 43.08 |
| f1 | 3.470 |
| f2 | −8.239 |
| f3 | 146.305 |
| f4 | −43.333 |
| f5 | 5.447 |
| f6 | −4.792 |

TABLE 18

Example 6

| | S3 | S4 | S5 | S6 | S7 | S8 |
|---|---|---|---|---|---|---|
| K | 0.1628 | 10.0000 | −10.0000 | −20.0000 | −10.0000 | 10.0000 |
| A3 | 0.00000E+00 | 0.00000E+00 | 0.00000E+00 | 0.00000E+00 | 0.00000E+00 | 0.00000E+00 |
| A4 | −4.86590E−03 | −2.09606E−02 | −2.20114E−02 | 7.45178E−02 | −2.41340E−02 | −7.68794E−02 |
| A5 | 0.00000E+00 | 0.00000E+00 | 0.00000E+00 | 0.00000E+00 | 0.00000E+00 | 0.00000E+00 |
| A6 | 1.32146E−02 | 1.93505E−02 | 4.83575E−02 | 9.21614E−02 | −3.10087E−02 | 1.24016E−02 |

TABLE 18-continued

Example 6

|     |              |              |              |              |              |              |
|-----|--------------|--------------|--------------|--------------|--------------|--------------|
| A7  | 0.00000E+00  | 0.00000E+00  | 0.00000E+00  | 0.00000E+00  | 0.00000E+00  | 0.00000E+00  |
| A8  | −3.67945E−02 | −3.11480E−03 | −3.96278E−02 | −6.38556E−01 | −2.97868E−02 | 4.03982E−02  |
| A9  | 0.00000E+00  | 0.00000E+00  | 0.00000E+00  | 0.00000E+00  | 0.00000E+00  | 0.00000E+00  |
| A10 | 2.67131E−02  | −2.70219E−02 | 9.45418E−02  | 1.85991E+00  | 6.18348E−02  | −1.44296E−01 |
| A11 | 0.00000E+00  | 0.00000E+00  | 0.00000E+00  | 0.00000E+00  | 0.00000E+00  | 0.00000E+00  |
| A12 | −2.07350E−03 | 1.21655E−02  | −1.41545E−01 | −2.73398E+00 | −1.11968E−01 | 7.98180E−02  |
| A13 | 0.00000E+00  | 0.00000E+00  | 0.00000E+00  | 0.00000E+00  | 0.00000E+00  | 0.00000E+00  |
| A14 | −9.92830E−03 | −5.96240E−03 | 1.01735E−01  | 2.05419E+00  | 7.88884E−02  | 9.70643E−03  |
| A15 | 0.00000E+00  | 0.00000E+00  | 0.00000E+00  | 0.00000E+00  | 0.00000E+00  | 0.00000E+00  |
| A16 | 0.00000E+00  | 5.51914E−06  | −2.90403E−02 | −6.13763E−01 | −5.66499E−03 | −1.00559E−02 |
| A17 | 0.00000E+00  | 0.00000E+00  | 0.00000E+00  | 0.00000E+00  | 0.00000E+00  | 0.00000E+00  |
| A18 | 0.00000E+00  | 5.80300E−07  | 0.00000E+00  | 0.00000E+00  | 0.00000E+00  | 0.00000E+00  |
| A19 | 0.00000E+00  | 0.00000E+00  | 0.00000E+00  | 0.00000E+00  | 0.00000E+00  | 0.00000E+00  |
| A20 | 0.00000E+00  | 0.00000E+00  | 0.00000E+00  | 0.00000E+00  | 0.00000E+00  | 0.00000E+00  |

|     | S9           | S10          | S11          | S12          | S13          | S14          |
|-----|--------------|--------------|--------------|--------------|--------------|--------------|
| K   | −10.0000     | 7.3733       | −10.0000     | −10.0000     | −0.6495      | −4.0636      |
| A3  | 4.41864E−03  | 4.38710E−02  | −1.54393E−02 | −1.00464E−01 | −6.16964E−02 | 4.39242E−03  |
| A4  | −1.34331E−01 | −2.31391E−01 | 6.91055E−02  | 2.40486E−02  | −3.78596E−01 | −1.85347E−01 |
| A5  | −2.10785E−01 | 5.66800E−02  | −1.21074E−01 | −7.79198E−03 | 1.58862E−01  | 1.00897E−01  |
| A6  | 3.18253E−01  | 4.24191E−02  | 2.05620E−02  | −1.71598E−02 | 3.56669E−02  | 2.77047E−02  |
| A7  | 4.52705E−02  | 1.76173E−02  | 2.99390E−02  | 1.34059E−02  | −5.15966E−03 | −3.81407E−02 |
| A8  | −1.47077E−01 | −2.30564E−02 | 3.92237E−03  | 1.04849E−02  | −1.14001E−02 | 8.44647E−03  |
| A9  | −7.64745E−02 | −4.48255E−03 | −1.15951E−02 | −2.11968E−03 | 4.80217E−04  | 1.95678E−04  |
| A10 | 1.73034E−02  | −1.04531E−02 | −2.81381E−03 | −2.74017E−03 | 1.29283E−03  | 2.19223E−04  |
| A11 | 4.74173E−02  | 2.42890E−03  | 2.77980E−03  | −5.41162E−04 | 2.41309E−05  | 4.94382E−05  |
| A12 | 9.29146E−03  | 6.72933E−04  | −2.35478E−03 | −7.40044E−05 | −1.11053E−04 | −1.19188E−04 |
| A13 | 2.07558E−03  | 1.36189E−03  | 1.65527E−03  | 3.46075E−04  | 1.63253E−06  | −2.76086E−06 |
| A14 | −2.70992E−04 | 4.26862E−03  | −1.14902E−03 | 8.01333E−05  | 5.45419E−06  | 1.23641E−05  |
| A15 | −1.56437E−02 | 1.51845E−03  | 6.53063E−04  | −5.43975E−05 | −6.57496E−07 | −3.43469E−07 |
| A16 | −8.54840E−03 | −4.40505E−04 | 2.79800E−04  | −3.23396E−06 | 1.15973E−08  | −3.76097E−07 |
| A17 | 8.65160E−03  | −1.20385E−03 | −4.69797E−05 | 1.08593E−06  | 1.13287E−09  | −4.13664E−09 |
| A18 | 1.12682E−02  | −9.04344E−04 | −1.58494E−04 | 7.50609E−07  | −1.24697E−09 | 2.15603E−11  |
| A19 | 5.79688E−03  | −4.69784E−05 | −2.00211E−05 | −1.85583E−07 | −1.57686E−10 | 3.73175E−10  |
| A20 | −1.04125E−02 | 3.83496E−04  | 3.39581E−05  | −7.24628E−08 | 9.03549E−11  | 2.14682E−10  |

Various aberrations in Numerical example 6 described above are illustrated in FIG. 12. As can be seen from the aberration diagrams, the imaging lens is favorably corrected in various aberrations while being small-sized, and has excellent optical performance.

Numerical Example 7

Table 19 shows lens data of Numerical example 7 in which specific numerical values are applied to the imaging lens 7 illustrated in FIG. 13. In addition, Table 20 shows values of the focal length f of the entire system, the F number Fno, the total length, and the half angle of view ω. Table 20 also shows values of the focal length f1 of the first lens, the focal length f2 of the second lens, the focal length f3 of the third lens, the focal length f4 of the fourth lens, the focal length f5 of the fifth lens, and the focal length f6 of the sixth lens. As illustrated in the numerical data, the fourth lens L4 has positive refractive power near the optical axis, in the imaging lens 7 illustrated in FIG. 13.

In addition, all of the first lens L1 to the sixth lens L6 are plastic lenses.

In the imaging lens 7, both surfaces of each of the first lens L1 to the sixth lens L6 have aspheric shapes. Table 21 shows values of aspheric surface coefficients A3 to A20 in the aspheric surfaces, together with the values of the coefficient K.

TABLE 19

Example 7

| Lens             | Si      | Ri        | Di     | Ndi   | vdi   |
|------------------|---------|-----------|--------|-------|-------|
| (Virtual Surface)| 1       | ∞         | 0.260  |       |       |
| (St)             | 2(STO)  | ∞         | −0.260 |       |       |
| L1               | 3(ASP)  | 1.6740    | 0.698  | 1.543 | 56.00 |
|                  | 4(ASP)  | 15.2566   | 0.030  |       |       |
| L2               | 5(ASP)  | −797.5994 | 0.200  | 1.650 | 21.50 |
|                  | 6(ASP)  | 4.7544    | 0.299  |       |       |
| L3               | 7(ASP)  | 10.9822   | 0.335  | 1.543 | 56.00 |
|                  | 8(ASP)  | −51.6486  | 0.347  |       |       |
| L4               | 9(ASP)  | 80.3669   | 0.305  | 1.635 | 23.90 |
|                  | 10(ASP) | −62.3580  | 0.365  |       |       |
| L5               | 11(ASP) | 34.6170   | 0.671  | 1.534 | 55.64 |
|                  | 12(ASP) | −8.7978   | 0.368  |       |       |
| L6               | 13(ASP) | 2.3943    | 0.490  | 1.534 | 55.64 |
|                  | 14(ASP) | 1.1322    | 0.535  |       |       |
| (SG)             | 15      | ∞         | 0.115  | 1.517 | 64.20 |
|                  | 16      | ∞         | 0.210  |       |       |
| (IMG)            | 17      | ∞         |        |       |       |

TABLE 20

Example 7

| f            | 4.178  |
|--------------|--------|
| Fno          | 2.04   |
| Total Length | 4.966  |
| ω            | 42.00  |
| f1           | 3.457  |
| f2           | −7.259 |
| f3           | 16.982 |
| f4           | 55.409 |

TABLE 20-continued

Example 7

| | |
|---|---|
| f5 | 13.200 |
| f6 | −4.648 |

In addition, all of the first lens L1 to the sixth lens L6 are plastic lenses.

In the imaging lens 8, both surfaces of each of the first lens L1 to the sixth lens L6 have aspheric shapes. Table 24 shows values of aspheric surface coefficients A3 to A20 in the aspheric surfaces, together with the values of the coefficient K.

TABLE 21

Example 7

| | S3 | S4 | S5 | S6 | S7 | S8 |
|---|---|---|---|---|---|---|
| K | −0.5615 | 0.0000 | 0.0000 | −25.3593 | −10.0000 | 9.6285 |
| A3 | 0.00000E+00 | 0.00000E+00 | 0.00000E+00 | 0.00000E+00 | 0.00000E+00 | 0.00000E+00 |
| A4 | 1.03550E−02 | −2.82280E−03 | 3.35559E−02 | 7.06751E−02 | −6.06869E−02 | −1.07488E−02 |
| A5 | 0.00000E+00 | 0.00000E+00 | 0.00000E+00 | 0.00000E+00 | 0.00000E+00 | 0.00000E+00 |
| A6 | 4.03833E−02 | −4.58773E−02 | −2.14133E−02 | 5.59923E−02 | 4.08971E−02 | −1.60213E−01 |
| A7 | 0.00000E+00 | 0.00000E+00 | 0.00000E+00 | 0.00000E+00 | 0.00000E+00 | 0.00000E+00 |
| A8 | −1.17927E−01 | 1.34914E−01 | −7.58683E−03 | −3.89240E−01 | −5.26656E−01 | 2.29544E−01 |
| A9 | 0.00000E+00 | 0.00000E+00 | 0.00000E+00 | 0.00000E+00 | 0.00000E+00 | 0.00000E+00 |
| A10 | 1.73740E−01 | −2.78200E−01 | 1.79315E−01 | 1.06524E+00 | 1.25938E+00 | −4.22784E−01 |
| A11 | 0.00000E+00 | 0.00000E+00 | 0.00000E+00 | 0.00000E+00 | 0.00000E+00 | 0.00000E+00 |
| A12 | −1.25921E−01 | 2.26918E−01 | −4.33481E−01 | −1.42003E+00 | −1.53693E+00 | 5.05752E−01 |
| A13 | 0.00000E+00 | 0.00000E+00 | 0.00000E+00 | 0.00000E+00 | 0.00000E+00 | 0.00000E+00 |
| A14 | 3.18502E−02 | −6.20014E−02 | 4.21880E−01 | 9.32775E−01 | 8.47310E−01 | −3.35610E−01 |
| A15 | 0.00000E+00 | 0.00000E+00 | 0.00000E+00 | 0.00000E+00 | 0.00000E+00 | 0.00000E+00 |
| A16 | 0.00000E+00 | 0.00000E+00 | −1.39106E−01 | −2.23037E−01 | −1.27659E−01 | 1.00668E−01 |
| A17 | 0.00000E+00 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 | 0.00000E+00 |
| A19 | 0.00000E+00 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 | 0.00000E+00 |

| | S9 | S10 | S11 | S12 | S13 | S14 |
|---|---|---|---|---|---|---|
| K | −13.7287 | −8.8506 | −34.2345 | 0.0000 | −50.0000 | −9.1615 |
| A3 | 0.00000E+00 | 0.00000E+00 | −4.59422E−03 | 1.17466E−03 | 1.22698E−01 | 1.90451E−01 |
| A4 | 5.35336E−02 | 7.59115E−02 | 5.68939E−02 | −2.11096E−01 | −4.95062E−01 | −3.70401E−01 |
| A5 | 0.00000E+00 | 0.00000E+00 | −3.29044E−02 | 4.67780E−01 | 2.17691E−01 | 1.14769E−01 |
| A6 | −1.13785E−01 | −1.47131E−01 | 3.14938E−02 | −4.05776E−01 | 5.58140E−04 | 1.01350E−01 |
| A7 | 0.00000E+00 | 0.00000E+00 | −1.72987E−01 | 8.12691E−02 | 6.05965E−03 | −7.85157E−02 |
| A8 | 8.72890E−02 | 1.63173E−01 | 1.87863E−01 | 5.85250E−02 | −9.81042E−03 | 1.14494E−02 |
| A9 | 0.00000E+00 | 0.00000E+00 | −6.25247E−02 | 1.68845E−02 | −2.48302E−04 | 2.44455E−03 |
| A10 | −8.06853E−02 | −1.51426E−01 | −6.64156E−03 | −4.40942E−02 | 1.25848E−03 | 1.28458E−04 |
| A11 | 0.00000E+00 | 0.00000E+00 | 2.18750E−03 | 7.90364E−03 | −1.37796E−05 | −8.40982E−05 |
| A12 | 3.55179E−02 | 8.43614E−02 | 3.21078E−03 | 3.07682E−03 | −1.33766E−04 | −1.11772E−04 |
| A13 | 0.00000E+00 | 0.00000E+00 | −3.17486E−03 | 4.44852E−04 | 4.33728E−06 | −3.28398E−06 |
| A14 | 8.75787E−04 | −2.33154E−02 | 8.41532E−04 | −4.57857E−05 | 9.18351E−06 | 1.31088E−05 |
| A15 | 0.00000E+00 | 0.00000E+00 | 4.20624E−04 | −3.80874E−04 | 5.53346E−07 | −6.65993E−07 |
| A16 | −2.77608E−03 | 2.47222E−03 | −1.14284E−04 | 9.10821E−05 | −5.00936E−07 | −2.64125E−07 |
| A17 | 0.00000E+00 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 | 0.00000E+00 |
| A19 | 0.00000E+00 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 | 0.00000E+00 |

Various aberrations in Numerical example 7 described above are illustrated in FIG. 14. As can be seen from the aberration diagrams, the imaging lens is favorably corrected in various aberrations while being small-sized, and has excellent optical performance.

Numerical Example 8

Table 22 shows lens data of Numerical example 8 in which specific numerical values are applied to the imaging lens 8 illustrated in FIG. 15. In addition, Table 23 shows values of the focal length f of the entire system, the F number Fno, the total length, and the half angle of view ω. Table 23 also shows values of the focal length f1 of the first lens, the focal length f2 of the second lens, the focal length f3 of the third lens, the focal length f4 of the fourth lens, the focal length f5 of the fifth lens, and the focal length f6 of the sixth lens. As illustrated in the numerical data, the fourth lens L4 has positive refractive power near the optical axis, in the imaging lens 8 illustrated in FIG. 15.

TABLE 22

Example 8

| Lens | Si | Ri | Di | Ndi | νdi |
|---|---|---|---|---|---|
| (Virtual Surface) | 1 | ∞ | 0.260 | | |
| (St) | 2(STO) | ∞ | −0.260 | | |
| L1 | 3(ASP) | 1.7222 | 0.703 | 1.534 | 55.64 |
| | 4(ASP) | 21.4769 | 0.030 | | |
| L2 | 5(ASP) | 22.6809 | 0.200 | 1.650 | 21.50 |
| | 6(ASP) | 3.5680 | 0.282 | | |
| L3 | 7(ASP) | 7.7248 | 0.335 | 1.534 | 55.64 |
| | 8(ASP) | 126.0159 | 0.288 | | |
| L4 | 9(ASP) | −85.4730 | 0.400 | 1.534 | 55.64 |
| | 10(ASP) | −25.0000 | 0.343 | | |
| L5 | 11(ASP) | 18.5789 | 0.782 | 1.534 | 55.64 |
| | 12(ASP) | −8.1297 | 0.375 | | |
| L6 | 13(ASP) | 2.3380 | 0.490 | 1.534 | 55.64 |
| | 14(ASP) | 1.0987 | 0.525 | | |

TABLE 22-continued

Example 8

| Lens | Si | Ri | Di | Ndi | vdi |
|---|---|---|---|---|---|
| (SG) | 15 | ∞ | 0.115 | 1.517 | 64.20 |
|  | 16 | ∞ | 0.210 |  |  |
| (IMG) | 17 | ∞ |  |  |  |

TABLE 23

Example 8

| f | 4.178 |
|---|---|
| Fno | 2.02 |
| Total Length | 5.078 |
| ω | 42.08 |
| f1 | 3.462 |
| f2 | −6.531 |
| f3 | 15.387 |
| f4 | 65.982 |
| f5 | 10.693 |
| f6 | −4.499 |

TABLE 24

Example 8

| | S3 | S4 | S5 | S6 | S7 | S8 |
|---|---|---|---|---|---|---|
| K | −0.5615 | 0.0000 | 0.0000 | −25.3593 | −10.0000 | 9.6285 |
| A3 | 0.00000E+00 | 0.00000E+00 | 0.00000E+00 | 0.00000E+00 | 0.00000E+00 | 0.00000E+00 |
| A4 | 7.82788E−03 | 3.28777E−03 | 2.47199E−02 | 9.17159E−02 | −4.52181E−02 | 2.83851E−03 |
| A5 | 0.00000E+00 | 0.00000E+00 | 0.00000E+00 | 0.00000E+00 | 0.00000E+00 | 0.00000E+00 |
| A6 | 4.15851E−02 | −4.14812E−02 | −9.07247E−03 | 3.36735E−02 | 3.83694E−02 | −1.70968E−01 |
| A7 | 0.00000E+00 | 0.00000E+00 | 0.00000E+00 | 0.00000E+00 | 0.00000E+00 | 0.00000E+00 |
| A8 | −1.23716E−01 | 1.32527E−01 | −1.49026E−02 | −3.81090E−01 | −5.23294E−01 | 2.25624E−01 |
| A9 | 0.00000E+00 | 0.00000E+00 | 0.00000E+00 | 0.00000E+00 | 0.00000E+00 | 0.00000E+00 |
| A10 | 1.78572E−01 | −2.81633E−01 | 1.71077E−01 | 1.06788E+00 | 1.25031E+00 | −4.16775E−01 |
| A11 | 0.00000E+00 | 0.00000E+00 | 0.00000E+00 | 0.00000E+00 | 0.00000E+00 | 0.00000E+00 |
| A12 | −1.27436E−01 | 2.28846E−01 | −4.31909E−01 | −1.44316E+00 | −1.51333E+00 | 5.08244E−01 |
| A13 | 0.00000E+00 | 0.00000E+00 | 0.00000E+00 | 0.00000E+00 | 0.00000E+00 | 0.00000E+00 |
| A14 | 3.23197E−02 | −6.41630E−02 | 4.28592E−01 | 9.64755E−01 | 8.29728E−01 | −3.42812E−01 |
| A15 | 0.00000E+00 | 0.00000E+00 | 0.00000E+00 | 0.00000E+00 | 0.00000E+00 | 0.00000E+00 |
| A16 | 0.00000E+00 | 0.00000E+00 | −1.44835E−01 | −2.39422E−01 | −1.26167E−01 | 1.03982E−01 |
| A17 | 0.00000E+00 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 | 0.00000E+00 |
| A19 | 0.00000E+00 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 | 0.00000E+00 |
| | S9 | S10 | S11 | S12 | S13 | S14 |
| K | −13.7287 | −8.8506 | −34.2345 | 0.0000 | −50.0000 | −9.1615 |
| A3 | 0.00000E+00 | 0.00000E+00 | −9.81049E−03 | −3.10512E−03 | 1.10283E−01 | 1.89084E−01 |
| A4 | 4.88521E−02 | 7.12417E−02 | 5.71051E−02 | −2.22757E−01 | −4.91892E−01 | −3.64554E−01 |
| A5 | 0.00000E+00 | 0.00000E+00 | −2.61209E−02 | 4.77912E−01 | 2.19852E−01 | 1.13178E−01 |
| A6 | −1.23984E−01 | −1.50701E−01 | 3.21568E−02 | −4.03160E−01 | 8.56624E−04 | 1.01156E−01 |
| A7 | 0.00000E+00 | 0.00000E+00 | −1.73771E−01 | 8.11983E−02 | 6.05420E−03 | −7.85070E−02 |
| A8 | 8.63768E−02 | 1.65094E−01 | 1.88033E−01 | 5.81263E−02 | −9.86168E−03 | 1.14718E−02 |
| A9 | 0.00000E+00 | 0.00000E+00 | −6.26787E−02 | 1.67386E−02 | −2.71188E−04 | 2.45667E−03 |
| A10 | −8.22991E−02 | −1.51478E−01 | −6.81704E−03 | −4.41491E−02 | 1.25050E−03 | 1.30494E−04 |
| A11 | 0.00000E+00 | 0.00000E+00 | 2.20235E−03 | 7.91484E−03 | −1.47993E−05 | −8.39541E−05 |
| A12 | 3.64883E−02 | 8.41593E−02 | 3.31918E−03 | 3.08625E−03 | −1.33238E−04 | −1.11912E−04 |
| A13 | 0.00000E+00 | 0.00000E+00 | −3.12203E−03 | 4.45862E−04 | 4.77924E−06 | −3.40277E−06 |
| A14 | 5.68986E−03 | −2.33320E−02 | 8.83868E−04 | −4.48077E−05 | 9.32242E−06 | 1.30929E−05 |
| A15 | 0.00000E+00 | 0.00000E+00 | 4.09384E−04 | −3.80833E−04 | 5.72835E−07 | −6.69492E−07 |
| A16 | −5.00536E−03 | 2.47796E−03 | −1.41035E−04 | 9.08800E−05 | −5.29106E−07 | −2.60477E−07 |
| A17 | 0.00000E+00 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 | 0.00000E+00 |
| A19 | 0.00000E+00 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 | 0.00000E+00 |

Various aberrations in Numerical example 8 described above are illustrated in FIG. 16. As can be seen from the aberration diagrams, the imaging lens is favorably corrected in various aberrations while being small-sized, and has excellent optical performance.

Numerical Example 9

Table 25 shows lens data of Numerical example 9 in which specific numerical values are applied to the imaging lens 9 illustrated in FIG. 17. In addition, Table 26 shows values of the focal length f of the entire system, the F number Fno, the total length, and the half angle of view ω. Table 26 also shows values of the focal length f1 of the first lens, the focal length f2 of the second lens, the focal length f3 of the third lens, the focal length f4 of the fourth lens, the focal length f5 of the fifth lens, and the focal length f6 of the sixth lens. As illustrated in the numerical data, the fourth lens L4 has positive refractive power near the optical axis, in the imaging lens 9 illustrated in FIG. 17.

In addition, all of the first lens L1 to the sixth lens L6 are plastic lenses.

In the imaging lens 9, both surfaces of each of the first lens L1 to the sixth lens L6 have aspheric shapes. Table 27 shows values of aspheric surface coefficients A3 to A20 in the aspheric surfaces, together with the values of the coefficient K.

TABLE 25

Example 9

| Lens | Si | Ri | Di | Ndi | vdi |
|---|---|---|---|---|---|
| (Virtual Surface) | 1 | ∞ | 0.330 | | |
| (St) | 2(STO) | ∞ | −0.330 | | |
| L1 | 3(ASP) | 2.0152 | 0.881 | 1.535 | 56.27 |
| | 4(ASP) | 135.2864 | 0.107 | | |
| L2 | 5(ASP) | 209.8366 | 0.320 | 1.635 | 23.90 |
| | 6(ASP) | 4.1855 | 0.402 | | |
| L3 | 7(ASP) | 5.0029 | 0.429 | 1.535 | 56.27 |
| | 8(ASP) | 6.9754 | 0.334 | | |
| L4 | 9(ASP) | −7.7121 | 0.400 | 1.635 | 23.90 |
| | 10(ASP) | −6.4915 | 0.346 | | |
| L5 | 11(ASP) | −5.2869 | 0.618 | 1.535 | 56.27 |
| | 12(ASP) | −3.0491 | 0.125 | | |
| L6 | 13(ASP) | 1.9287 | 0.768 | 1.535 | 56.27 |
| | 14(ASP) | 1.0470 | 1.001 | | |

TABLE 25-continued

Example 9

| Lens | Si | Ri | Di | Ndi | vdi |
|---|---|---|---|---|---|
| (SG) | 15 | ∞ | 0.110 | 1.517 | 64.20 |
| | 16 | ∞ | 0.210 | | |
| (IMG) | 17 | ∞ | | | |

TABLE 26

Example 9

| | |
|---|---|
| f | 5.175 |
| Fno | 2.07 |
| Total Length | 6.050 |
| ω | 34.32 |
| f1 | 3.818 |
| f2 | −6.738 |
| f3 | 30.764 |
| f4 | 57.370 |
| f5 | 12.293 |
| f6 | −6.149 |

TABLE 27

Example 9

| | S3 | S4 | S5 | S6 | S7 | S8 |
|---|---|---|---|---|---|---|
| K | 0.4367 | 10.0000 | 10.0000 | −2.1351 | 0.0000 | −12.9731 |
| A3 | 0.00000E+00 | 0.00000E+00 | −1.05893E−02 | 3.76836E−03 | −1.89290E−02 | −1.65268E−02 |
| A4 | −9.72736E−03 | −5.21377E−02 | −6.85944E−02 | −1.00479E−01 | −6.33860E−02 | −4.80518E−03 |
| A5 | 0.00000E+00 | 0.00000E+00 | −7.93513E−02 | 9.45402E−02 | 2.41394E−02 | −9.06291E−02 |
| A6 | −2.47005E−04 | 6.43730E−02 | 4.29529E−01 | 4.98807E−02 | −2.39148E−02 | 1.52376E−01 |
| A7 | 0.00000E+00 | 0.00000E+00 | −4.72744E−01 | −3.59329E−02 | 5.20785E−03 | −1.10413E−01 |
| A8 | −1.78252E−03 | −3.65371E−02 | 2.84781E−01 | −4.34451E−03 | 5.08842E−03 | −1.51032E−03 |
| A9 | 0.00000E+00 | 0.00000E+00 | −1.30904E−01 | −1.55378E−02 | −8.05683E−04 | 3.82472E−02 |
| A10 | −1.54902E−03 | −1.38663E−03 | 3.45903E−02 | 1.62126E−02 | −2.10997E−04 | −1.28606E−02 |
| A11 | 0.00000E+00 | 0.00000E+00 | 0.00000E+00 | 0.00000E+00 | 0.00000E+00 | 0.00000E+00 |
| A12 | −5.70639E−04 | 7.33245E−03 | 0.00000E+00 | 0.00000E+00 | 0.00000E+00 | 0.00000E+00 |
| A13 | 0.00000E+00 | 0.00000E+00 | 0.00000E+00 | 0.00000E+00 | 0.00000E+00 | 0.00000E+00 |
| A14 | 1.17619E−03 | −2.88204E−03 | 0.00000E+00 | 0.00000E+00 | 0.00000E+00 | 0.00000E+00 |
| A15 | 0.00000E+00 | 0.00000E+00 | 0.00000E+00 | 0.00000E+00 | 0.00000E+00 | 0.00000E+00 |
| A16 | −5.76891E−04 | 3.67563E−04 | 0.00000E+00 | 0.00000E+00 | 0.00000E+00 | 0.00000E+00 |
| A17 | 0.00000E+00 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 | 0.00000E+00 |
| A19 | 0.00000E+00 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 | 0.00000E+00 |

| | S9 | S10 | S11 | S12 | S13 | S14 |
|---|---|---|---|---|---|---|
| K | 0.0000 | 10.0000 | 0.2461 | 0.0000 | −12.0000 | −3.5343 |
| A3 | 1.37012E−01 | 2.10708E−01 | 2.21240E−01 | 2.73051E−02 | 0.00000E+00 | −1.12939E−01 |
| A4 | −3.18743E−01 | −2.30084E−01 | 8.52293E−02 | 1.65350E−01 | −9.82408E−02 | 3.43391E−02 |
| A5 | 1.58802E−01 | −9.20345E−02 | −2.21932E−01 | −5.97539E−02 | 0.00000E+00 | −1.02159E−02 |
| A6 | 7.28286E−02 | 2.16573E−01 | 6.83025E−02 | −2.58441E−02 | 2.82182E−02 | 2.87257E−03 |
| A7 | −2.46552E−02 | −8.87610E−02 | 2.67680E−02 | 6.86131E−03 | 0.00000E+00 | 1.65912E−03 |
| A8 | −1.34941E−01 | −2.50632E−02 | −1.28090E−02 | 3.50110E−03 | −3.20026E−03 | −9.06855E−04 |
| A9 | 1.23157E−01 | 3.48919E−02 | −3.48355E−03 | 4.29433E−04 | 0.00000E+00 | −7.08944E−05 |
| A10 | −3.17957E−02 | −8.51990E−03 | 3.80194E−04 | −3.51258E−04 | 1.24649E−04 | 2.27633E−05 |
| A11 | 0.00000E+00 | 0.00000E+00 | 1.26444E−03 | −2.09672E−04 | 0.00000E+00 | 2.63955E−05 |
| A12 | 0.00000E+00 | 0.00000E+00 | −3.10116E−04 | 6.20708E−05 | 1.19703E−06 | −5.48434E−06 |
| A13 | 0.00000E+00 | 0.00000E+00 | 0.00000E+00 | 0.00000E+00 | 0.00000E+00 | 0.00000E+00 |
| A14 | 0.00000E+00 | 0.00000E+00 | 0.00000E+00 | 0.00000E+00 | −8.77855E−08 | 0.00000E+00 |
| A15 | 0.00000E+00 | 0.00000E+00 | 0.00000E+00 | 0.00000E+00 | 0.00000E+00 | 0.00000E+00 |
| A16 | 0.00000E+00 | 0.00000E+00 | 0.00000E+00 | 0.00000E+00 | 0.00000E+00 | 0.00000E+00 |
| A17 | 0.00000E+00 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 | 0.00000E+00 |
| A19 | 0.00000E+00 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 | 0.00000E+00 |

Various aberrations in Numerical example 9 described above are illustrated in FIG. 18. As can be seen from the aberration diagrams, the imaging lens is favorably corrected in various aberrations while being small-sized, and has excellent optical performance.

Numerical Example 10

Table 28 shows lens data of Numerical example 10 in which specific numerical values are applied to the imaging lens 10 illustrated in FIG. 19. In addition, Table 29 shows values of the focal length f of the entire system, the F number Fno, the total length, and the half angle of view ω. Table 29 also shows values of the focal length f1 of the first lens, the focal length f2 of the second lens, the focal length f3 of the third lens, the focal length f4 of the fourth lens, the focal length f5 of the fifth lens, and the focal length f6 of the sixth lens. As illustrated in the numerical data, the fourth lens L4 has positive refractive power near the optical axis, in the imaging lens 10 illustrated in FIG. 19.

In addition, all of the first lens L1 to the sixth lens L6 are plastic lenses.

In the imaging lens 10, both surfaces of each of the first lens L1 to the sixth lens L6 have aspheric shapes. Table 30 shows values of aspheric surface coefficients A3 to A20 in the aspheric surfaces, together with the values of the coefficient K.

TABLE 28

| | Example 10 | | | | |
|---|---|---|---|---|---|
| Lens | Si | Ri | Di | Ndi | vdi |
| (Virtual Surface) | 1 | ∞ | 0.330 | | |
| (St) | 2(STO) | ∞ | −0.330 | | |

TABLE 28-continued

| | Example 10 | | | | |
|---|---|---|---|---|---|
| Lens | Si | Ri | Di | Ndi | vdi |
| L1 | 3(ASP) | 2.0166 | 0.856 | 1.534 | 55.64 |
| | 4(ASP) | 122.6989 | 0.070 | | |
| L2 | 5(ASP) | 191.0352 | 0.297 | 1.635 | 23.90 |
| | 6(ASP) | 4.1730 | 0.527 | | |
| L3 | 7(ASP) | 5.0012 | 0.753 | 1.534 | 55.64 |
| | 8(ASP) | 6.8549 | 0.365 | | |
| L4 | 9(ASP) | −7.6274 | 0.535 | 1.534 | 55.64 |
| | 10(ASP) | −6.4979 | 0.063 | | |
| L5 | 11(ASP) | 11.0000 | 0.816 | 1.534 | 55.64 |
| | 12(ASP) | −100.0000 | 0.524 | | |
| L6 | 13(ASP) | 1.9280 | 0.596 | 1.534 | 55.64 |
| | 14(ASP) | 1.0460 | 0.561 | | |
| (SG) | 15 | ∞ | 0.110 | 1.517 | 64.20 |
| | 16 | ∞ | 0.210 | | |
| (IMG) | 17 | ∞ | | | |

TABLE 29

| Example 10 | |
|---|---|
| F | 5.169 |
| Fno | 2.15 |
| Total Length | 6.281 |
| ω | 28.03 |
| f1 | 3.828 |
| f2 | −6.731 |
| f3 | 30.324 |
| f4 | 70.502 |
| f5 | 18.595 |
| f6 | −5.597 |

TABLE 30

| | Example 10 | | | | | |
|---|---|---|---|---|---|---|
| | S3 | S4 | S5 | S6 | S7 | S8 |
| K | 0.4367 | 10.0000 | 10.0000 | −2.1351 | 0.0000 | −12.9731 |
| A3 | 0.00000E+00 | 0.00000E+00 | −1.08927E−02 | 9.43473E−03 | 2.82570E−03 | −3.17101E−02 |
| A4 | −8.31218E−03 | −3.39478E−02 | −1.05663E−02 | −6.32732E−02 | −4.57685E−02 | −3.59803E−02 |
| A5 | 0.00000E+00 | 0.00000E+00 | −1.19168E−01 | 9.32421E−02 | −2.06937E−02 | 4.73245E−03 |
| A6 | 4.25279E−03 | 6.74114E−02 | 4.26016E−01 | 1.73826E−02 | 2.34206E−02 | −8.24162E−03 |
| A7 | 0.00000E+00 | 0.00000E+00 | −4.72921E−01 | −2.30533E−02 | 7.52085E−03 | −1.23250E−02 |
| A8 | −4.76301E−03 | −5.84572E−02 | 2.78500E−01 | −1.14047E−02 | −7.66681E−03 | 1.05482E−02 |
| A9 | 0.00000E+00 | 0.00000E+00 | −1.34109E−01 | −1.99841E−02 | −4.20704E−03 | 7.95228E−03 |
| A10 | −1.13076E−03 | 1.15331E−02 | 4.10709E−02 | 2.22481E−02 | 2.22569E−05 | −5.75629E−03 |
| A11 | 0.00000E+00 | 0.00000E+00 | 0.00000E+00 | 0.00000E+00 | 0.00000E+00 | 0.00000E+00 |
| A12 | 3.15131E−04 | 8.96741E−03 | 0.00000E+00 | 0.00000E+00 | 0.00000E+00 | 0.00000E+00 |
| A13 | 0.00000E+00 | 0.00000E+00 | 0.00000E+00 | 0.00000E+00 | 0.00000E+00 | 0.00000E+00 |
| A14 | 1.49756E−03 | −6.71059E−03 | 0.00000E+00 | 0.00000E+00 | 0.00000E+00 | 0.00000E+00 |
| A15 | 0.00000E+00 | 0.00000E+00 | 0.00000E+00 | 0.00000E+00 | 0.00000E+00 | 0.00000E+00 |
| A16 | −8.61222E−04 | 1.43163E−03 | 0.00000E+00 | 0.00000E+00 | 0.00000E+00 | 0.00000E+00 |
| A17 | 0.00000E+00 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 | 0.00000E+00 |
| A19 | 0.00000E+00 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 | 0.00000E+00 |
| | S9 | S10 | S11 | S12 | S13 | S14 |
| K | 0.0000 | 10.0000 | 0.2461 | 0.0000 | −12.0000 | −3.5343 |
| A3 | 7.67593E−03 | 9.13419E−02 | 2.00349E−02 | −2.77716E−02 | 0.00000E+00 | −1.13990E−01 |
| A4 | −6.58527E−02 | −2.07093E−01 | −3.47403E−02 | 1.67979E−05 | −1.32191E−01 | 2.99548E−02 |
| A5 | −5.52321E−02 | 1.35584E−01 | −9.51093E−03 | −6.20993E−03 | 0.00000E+00 | −7.99320E−03 |
| A6 | 1.16295E−02 | −1.88624E−02 | −1.80772E−03 | −2.54983E−03 | 2.92668E−02 | 2.29160E−04 |
| A7 | 1.63364E−02 | −2.58317E−03 | 1.05088E−03 | −6.29161E−04 | 0.00000E+00 | 3.04995E−03 |
| A8 | −1.42187E−01 | 1.43390E−03 | 4.60889E−04 | 1.16366E−06 | −2.98105E−03 | −9.37427E−04 |
| A9 | 1.11034E−01 | −1.26162E−03 | −8.03238E−05 | 1.49694E−04 | 0.00000E+00 | 5.48500E−05 |
| A10 | −2.78507E−02 | 9.79663E−06 | −3.11872E−04 | 1.51793E−04 | −1.75756E−04 | −4.66081E−05 |
| A11 | 0.00000E+00 | 0.00000E+00 | 0.00000E+00 | 0.00000E+00 | 0.00000E+00 | −5.45639E−06 |
| A12 | 0.00000E+00 | 0.00000E+00 | 0.00000E+00 | 0.00000E+00 | 4.87059E−05 | 5.91255E−06 |

TABLE 30-continued

| | | | Example 10 | | | |
|---|---|---|---|---|---|---|
| A13 | 0.00000E+00 | 0.00000E+00 | 0.00000E+00 | 0.00000E+00 | 0.00000E+00 | 0.00000E+00 |
| A14 | 0.00000E+00 | 0.00000E+00 | 0.00000E+00 | 0.00000E+00 | 3.79474E−07 | 0.00000E+00 |
| A15 | 0.00000E+00 | 0.00000E+00 | 0.00000E+00 | 0.00000E+00 | 0.00000E+00 | 0.00000E+00 |
| A16 | 0.00000E+00 | 0.00000E+00 | 0.00000E+00 | 0.00000E+00 | 0.00000E+00 | 0.00000E+00 |
| A17 | 0.00000E+00 | 0.00000E+00 | 0.00000E+00 | 0.00000E+00 | 0.00000E+00 | 0.00000E+00 |
| A18 | 0.00000E+00 | 0.00000E+00 | 0.00000E+00 | 0.00000E+00 | 0.00000E+00 | 0.00000E+00 |
| A19 | 0.00000E+00 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 | 0.00000E+00 |

Various aberrations in Numerical example 10 described above are illustrated in FIG. 20. As can be seen from the aberration diagrams, the imaging lens is favorably corrected in various aberrations while being small-sized, and has excellent optical performance.

Other Numerical Data of Examples

Table 31 is a summary of values related to the above-described conditional expressions for each of Numerical examples. As can be seen from Table 31, the values related to the conditional expressions in Numerical examples are within the respective numerical ranges.

TABLE 31

| Conditional Expression | Example 1 | Example 2 | Example 3 | Example 4 | Example 5 |
|---|---|---|---|---|---|
| f1/f5 | 0.894 | 0.880 | 0.800 | 0.934 | 0.897 |
| (L5R1 + L5R2)/(L5R1 − L5R2) | 0.640 | 0.762 | −0.027 | 0.737 | 0.661 |
| f2/f6 | 2.622 | 2.074 | 2.520 | 3.314 | 2.405 |
| f2/f | −2.269 | −2.177 | −2.764 | −2.651 | −2.017 |
| ΣD/f | 1.260 | 1.255 | 1.249 | 1.273 | 1.244 |
| f5/f | 0.994 | 1.076 | 1.153 | 0.979 | 0.947 |
| ΣD/L2d | 23.677 | 23.590 | 24.351 | 23.966 | 23.410 |
| ν4 − ν2 | 2.396 | 2.396 | 2.396 | 2.396 | 2.396 |

| | Example 6 | Example 7 | Example 8 | Example 9 | Example 10 |
|---|---|---|---|---|---|
| f1/f5 | 0.637 | 0.262 | 0.324 | 0.311 | 0.206 |
| (L5R1 + L5R2)/(L5R1 − L5R2) | 1.058 | 0.595 | 0.391 | 3.725 | −0.802 |
| f2/f6 | 1.719 | 1.562 | 1.452 | 1.096 | 1.203 |
| f2/f | −2.016 | −1.738 | −1.563 | −1.302 | −1.302 |
| ΣD/f | 1.248 | 1.189 | 1.215 | 1.169 | 1.215 |
| f5/f | 1.333 | 3.160 | 2.559 | 2.375 | 3.598 |
| ΣD/L2d | 23.506 | 24.831 | 25.390 | 18.907 | 21.146 |
| ν4 − ν2 | 2.396 | 2.396 | 34.135 | 0.000 | 31.739 |

5. Other Embodiments

The technology of the disclosure is not limited to the above description of the embodiments and the examples, and may be variously modified.

For example, the shapes of the respective sections and the numerical values illustrated in Numerical examples mentioned above are merely implementation examples of the technology, and the technical scope of the technology should not be limitedly construed by the implementation examples.

In addition, the configuration configured of substantially six lenses has been described in the embodiment and the examples described above; however, a configuration further including a lens that does not have refractive power substantially is adoptable.

Moreover, the technology may achieve the following configuration, for example.

[1]
An imaging lens including
a first lens including a meniscus lens that has a convex surface facing object side and has positive refractive power near an optical axis;
a second lens having a convex surface facing the object side and having negative refractive power near the optical axis;
a third lens having positive refractive power near the optical axis;
a fourth lens;
a fifth lens having positive refractive power near the optical axis; and
a sixth lens having negative refractive power near the optical axis and having an aspheric surface on the image plane side, the aspheric surface having an inflection point, the first lens, the second lens, the third lens, the fourth lens, the fifth lens, and the sixth lens being disposed in order from the object side toward the image plane side, in which
the imaging lens satisfies the following conditional expressions, $$f1/f5 < 1 \qquad (1)$$

$$-0.9 < (L5R1+L5R2)/(L5R1-L5R2) < 4 \qquad (2)$$

$$f2/f6 > 1 \qquad (3)$$

where f1 is a focal length of the first lens, f5 is a focal length of the fifth lens, L5R1 is a paraxial radius of curvature of a surface, on the object side, of the fifth lens, L5R2 is a paraxial radius of curvature of a surface, on the image plane side, of the fifth lens, f2 is a focal length of the second lens, and f6 is a focal length of the sixth lens.

[2]
The imaging lens according to [1], in which the imaging lens satisfies the following condition, $$f2/f < -1 \qquad (4)$$

where f is a focal length of an entire system.

[3]
The imaging lens according to [1] or [2], in which the imaging lens satisfies the following condition, $$\Sigma D/f > 1 \qquad (5)$$

where ΣD is a length on the optical axis from an apex of a surface, on the object side, of the first lens to an image plane.

[4]
The imaging lens according to any one of [1] to [3], in which the imaging lens satisfies the following condition.

$$f5/f > 0.85 \qquad (6)$$

[5]
The imaging lens according to any one of [1] to [4], in which the imaging lens satisfies the following condition, $$\Sigma D/L2d > 18 \quad (7)$$

where L2d is a center thickness of the second lens.

[6]
The imaging lens according to any one of [1] to [5], in which the imaging lens satisfies the following condition, $$v4-v2<37 \quad (8)$$

where v2 is Abbe number of the second lens, and v4 is Abbe number of the fourth lens.

[7]
The imaging lens according to any one of [1] to [6], in which each of the first to sixth lenses is a plastic lens.

[8]
The imaging lens according to any one of [1] to [7], in which the surface, on the image plane side, of the sixth lens has an aspheric shape in which a part near the optical axis has a concave shape and a peripheral part has a convex shape.

[9]
The imaging lens according to any one of [1] to [9], further including a lens that substantially has no refractive power.

[10]
An imaging unit provided with an imaging lens and an imaging device, the imaging device outputting an imaging signal based on an optical image formed by the imaging lens, the imaging lens including:
a first lens including a meniscus lens that has a convex surface facing object side and has positive refractive power near an optical axis;
a second lens having a convex surface facing the object side and having negative refractive power near the optical axis;
a third lens having positive refractive power near the optical axis;
a fourth lens;
a fifth lens having positive refractive power near the optical axis; and
a sixth lens having negative refractive power near the optical axis and having an aspheric surface on most image plane side, the aspheric surface having an inflection point, the first lens, the second lens, the third lens, the fourth lens, the fifth lens, and the sixth lens being disposed in order from the object side toward the image plane side, in which
the imaging lens satisfies the following conditional expressions, $$f1/f5<1 \quad (1)$$

$$-0.9<(L5R1+L5R2)/(L5R1-L5R2)<4 \quad (2)$$

$$f2/f6>1 \quad (3)$$

where f1 is a focal length of the first lens, f5 is a focal length of the fifth lens, L5R1 is a paraxial radius of curvature of a surface, on the object side, of the fifth lens, L5R2 is a paraxial radius of curvature of a surface, on the image plane side, of the fifth lens, f2 is a focal length of the second lens, and f6 is a focal length of the sixth lens.

[11]
The imaging unit according to [10], in which the imaging lens further includes a lens that substantially has no refractive power.

This application is based upon and claims the benefit of priority of the Japanese Patent Application No. 2014-250619 filed in the Japan Patent Office on Dec. 11, 2014, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging lens, comprising:
a first lens including a meniscus lens that has a convex surface facing object side and has positive refractive power near an optical axis;
a second lens having a convex surface facing the object side and having negative refractive power near the optical axis;
a third lens having positive refractive power near the optical axis;
a fourth lens;
a fifth lens having positive refractive power near the optical axis; and
a sixth lens having negative refractive power near the optical axis and having an aspheric surface on the image plane side, the aspheric surface having an inflection point, the first lens, the second lens, the third lens, the fourth lens, the fifth lens, and the sixth lens being disposed in order from the object side toward the image plane side,
wherein the imaging lens satisfies the following conditional expressions:

$$f1/f5<1,$$

$$-0.9<(L5R1+L5R2)/(L5R1-L5R2)<4,$$

$$f2/f6>1, \text{ and}$$

wherein the f1 is a focal length of the first lens, the f5 is a focal length of the fifth lens, the L5R1 is a paraxial radius of curvature of a first surface, on the object side, of the fifth lens, L5R2 is a paraxial radius of curvature of a second surface, on the image plane side, of the fifth lens, the f2 is a focal length of the second lens, and the f6 is a focal length of the sixth lens.

2. The imaging lens according to claim 1, wherein the imaging lens satisfies the following condition:

$$f2/f<-1, \text{ and}$$

wherein the f is a focal length of an entire system.

3. The imaging lens according to claim 1, wherein the imaging lens satisfies the following condition:

$$\Sigma D/f>1, \text{ and}$$

wherein the $\Sigma D$ is a length on the optical axis from an apex of a third surface, on the object side, of the first lens to an image plane.

4. The imaging lens according to claim 1, wherein the imaging lens satisfies the following condition:

$$f5/f>0.85.$$

5. The imaging lens according to claim 1, wherein the imaging lens satisfies the following condition:

$$\Sigma D/L2d>18, \text{ and}$$

wherein the L2d is a center thickness of the second lens.

6. The imaging lens according to claim 1, wherein the imaging lens satisfies the following condition:

$$v4-v2<37, \text{ and}$$

wherein the v2 is Abbe number of the second lens, and the v4 is Abbe number of the fourth lens.

7. The imaging lens according to claim 1, wherein each of the first lens, the second lens, the third lens, the fourth lens, the fifth lens, and the sixth lens is a plastic lens.

8. The imaging lens according to claim 1, wherein a third surface, on the image plane side, of the sixth lens has an aspheric shape in which a part near the optical axis has a concave shape and a peripheral part has a convex shape.

9. An imaging unit, comprising:
an imaging lens configured to generate an optical image; and
an imaging device configured to out an imaging signal based on the generated optical image,
wherein the imaging lens comprising:
a first lens including a meniscus lens that has a convex surface facing object side and has positive refractive power near an optical axis;
a second lens having a convex surface facing the object side and having negative refractive power near the optical axis;
a third lens having positive refractive power near the optical axis;
a fourth lens;
a fifth lens having positive refractive power near the optical axis; and
a sixth lens having negative refractive power near the optical axis and having an aspheric surface on most image plane side, the aspheric surface having an inflection point, the first lens, the second lens, the third lens, the fourth lens, the fifth lens, and the sixth lens being disposed in order from the object side toward the image plane side,
wherein the imaging lens satisfies the following conditional expressions:

$f1/f5<1$, $-0.9<(L5R1+L5R2)/(L5R1-L5R2)<4$, $f2/f6>1$, and wherein the f1 is a focal length of the first lens, the f5 is a focal length of the fifth lens, the L5R1 is a paraxial radius of curvature of a first surface, on the object side, of the fifth lens, the L5R2 is a paraxial radius of curvature of a second surface, on the image plane side, of the fifth lens, the f2 is a focal length of the second lens, and the f6 is a focal length of the sixth lens.

* * * * *